(12) United States Patent
Dietze et al.

(10) Patent No.: US 11,060,000 B2
(45) Date of Patent: *Jul. 13, 2021

(54) HYDROXYL FUNCTIONALIZED POLYBUTADIENE POLYURETHANE HOTMELT PREPOLYMER

(71) Applicant: TESA SE, Norderstedt (DE)

(72) Inventors: Sebastian Dietze, Hamburg (DE); Uwe Schümann, Pinneberg (DE)

(73) Assignee: TESA SE, Norderstedt (DE)

(*) Notice: Subject to any disclaimer, the term of this patent is extended or adjusted under 35 U.S.C. 154(b) by 188 days.

This patent is subject to a terminal disclaimer.

(21) Appl. No.: 16/337,701

(22) PCT Filed: Sep. 12, 2017

(86) PCT No.: PCT/EP2017/072847
§ 371 (c)(1),
(2) Date: Mar. 28, 2019

(87) PCT Pub. No.: WO2018/059930
PCT Pub. Date: Apr. 5, 2018

(65) Prior Publication Data
US 2020/0040224 A1    Feb. 6, 2020

(30) Foreign Application Priority Data
Sep. 30, 2016  (DE) ............... 10 2016 218 964.6

(51) Int. Cl.
*C09J 7/38* (2018.01)
*C09J 7/10* (2018.01)
(Continued)

(52) U.S. Cl.
CPC ............. *C09J 7/38* (2018.01); *B29B 7/485* (2013.01); *B29B 7/845* (2013.01); *B29B 7/86* (2013.01);
(Continued)

(58) Field of Classification Search
CPC ....................................................... C09J 7/38
See application file for complete search history.

(56) References Cited

U.S. PATENT DOCUMENTS

| 3,515,773 A | 6/1970 | Dahl |
| 3,743,617 A | 7/1973 | Kest |

(Continued)

FOREIGN PATENT DOCUMENTS

| DE | 3830894 A1 | 3/1990 |
| EP | 0356715 A1 | 6/1993 |

(Continued)

OTHER PUBLICATIONS

German Office Action for corresponding application DE 10 2016 218 964.6 dated May 9, 2017.

(Continued)

*Primary Examiner* — Tae H Yoon
(74) *Attorney, Agent, or Firm* — Norris McLaughlin PA

(57) ABSTRACT

A hydroxyl-functionalized polybutadiene polyurethane hotmelt prepolymer that comprises the chemical reaction product of at least one polybutadiene diol, at least one chain extender having a hydroxyl functionality of two and a molecular weight of less than or equal to 300 g/mol and optionally at least one polybutadiene polyol that has a number-average mean functionality between greater than 2.0 and less than or equal to 3.0 with at least one aliphatic or alicyclic diisocyanate, is thermally vulcanizable, and at room temperature is sufficiently solid or high-viscosity that it can be rolled into a roll as a film applied to a carrier without flowing out or being squeezed out on the side.

20 Claims, 1 Drawing Sheet

(51) Int. Cl.
| | |
|---|---|
| *B29B 7/48* | (2006.01) |
| *B29B 7/84* | (2006.01) |
| *B29B 7/86* | (2006.01) |
| *C08G 18/22* | (2006.01) |
| *C08G 18/32* | (2006.01) |
| *C08G 18/62* | (2006.01) |
| *C09J 11/04* | (2006.01) |
| *C09J 11/06* | (2006.01) |
| *C09J 11/08* | (2006.01) |
| *C08G 18/65* | (2006.01) |
| *C08G 18/75* | (2006.01) |
| *B29K 75/00* | (2006.01) |
| *B29K 105/00* | (2006.01) |

(52) U.S. Cl.
CPC ....... *C08G 18/227* (2013.01); *C08G 18/3206* (2013.01); *C08G 18/6208* (2013.01); *C08G 18/6511* (2013.01); *C08G 18/755* (2013.01); *C08G 18/758* (2013.01); *C09J 7/10* (2018.01); *C09J 11/04* (2013.01); *C09J 11/06* (2013.01); *C09J 11/08* (2013.01); *B29K 2075/00* (2013.01); *B29K 2105/0097* (2013.01); *C09J 2301/408* (2020.08); *C09J 2463/00* (2013.01); *C09J 2475/00* (2013.01); *C09J 2491/00* (2013.01); *C09J 2495/00* (2013.01)

(56) References Cited

U.S. PATENT DOCUMENTS

| | | | | |
|---|---|---|---|---|
| 5,401,565 | A | * | 3/1995 | Vouette .................. A41D 27/06 428/343 |
| 6,780,957 | B1 | * | 8/2004 | Haider .................. C08G 18/10 528/61 |
| 2003/0149179 | A1 | | 8/2003 | Chao et al. |
| 2009/0124751 | A1 | | 5/2009 | Lucas et al. |
| 2011/0111221 | A1 | * | 5/2011 | Schumann ......... C08G 18/6674 428/355 N |

FOREIGN PATENT DOCUMENTS

| | | |
|---|---|---|
| EP | 0877069 B1 | 6/2000 |
| EP | 1279687 A2 | 1/2003 |
| JP | S5920076 A | 12/1984 |
| JP | S59230076 A | 12/1984 |
| WO | 9830648 A1 | 7/1998 |

OTHER PUBLICATIONS

International Search Report for corresponding application PCT/EP2017/072847 dated Feb. 9, 2018.

Chao, H., et. al., "Progress in Chain Extender Evaluation for Polyurethanes Derived from Hydroxyl-Terminated Polybutadiene Resins", Cray Valley USA, LLC, pp. 1-7, Exton, Pennsylvania, 2010.

TW Office Action issued in corresponding application TW 106131163 dated Apr. 27, 2018.

D. Satas, "Handbook of Pressure Sensitive Adhesives", Third Edition, pp. 153 to 203, 1999.

* cited by examiner

HYDROXYL FUNCTIONALIZED POLYBUTADIENE POLYURETHANE HOTMELT PREPOLYMER

This is an application filed under 35 USC 371 based on PCT/EP2017/072847, which in turn is based on DE 10 2016 218964.6 filed 30 Sep. 2016. The present application claims the full priority benefit of these prior applications and herein incorporates by reference the full disclosures of these prior applications.

The present invention relates to a tacky, meltable, hydroxyl-functionalized polybutadiene polyurethane hotmelt prepolymer, a method for its production, a pressure-sensitive adhesive having the prepolymer as a base polymer and an adhesive tape comprising the pressure-sensitive adhesive.

Thermally vulcanizable pressure-sensitive adhesive tapes are known. EP 877069 B1 (Beiersdorf) describes a tacky film based on a thermally vulcanizable polyesterified rubber. Its disadvantage is that the polyesterification reaction leads to a crosslinked elastomer, so that on completion of the reaction, compounding of the elastomer with vulcanization auxiliaries, fillers and further components is not possible. These substances must be dispersed or mixed in in advance before the crosslinking reaction has progressed. At this point, however, the reaction mixture is still liquid or pasty at room temperature. The polymer is not formed until the crosslinking reaction gradually proceeds during coating. This is disadvantageous in that the coating speed is limited, as when it is still in a liquid or pasty state, the reaction mixture coated onto a release liner or a carrier material cannot be wound up, or at least cannot be wound up with a constant layer thickness. Only solid polymer films can be wound up with a constant layer thickness. It is therefore necessary to wait for the reaction to progress until the reaction mixture has solidified before the reaction product can be wound up. The coating speed must be set at a correspondingly slow rate. In addition, polyesteified rubbers have the potential drawback of readily undergoing hydrolytic cleavage.

In principle, the rubber described in German Unexamined Patent Application DE 3830895 A (Hüls), composed of at least two starting polymers that are chemically bonded to one another via ester groups and at least one of which is olefinically unsaturated, has similar drawbacks as a possible base elastomer of a thermally vulcanizable pressure-sensitive adhesive tape.

The same applies to the liquid or coatable, vulcanizable rubber mixture based on polyesteified polymers, at least one of which is olefinically unsaturated, described in EP 0356715 B1 (Henkel).

Alternatively, tacky polybutadiene-based polyurethanes could form a possible base elastomer for a thermally vulcanizable pressure-sensitive adhesive tape. A polybutadiene polyurethane pressure-sensitive adhesive is described in JP 59230076A (Sekisui). A polybutadiene polyol with a functionality of 2.2 to 2.4 is reacted therein with a polyisocyanate in an NCO/OH ratio of 0.2 to 0.65 in order to form a polyol with a molecular weight of 5,000 to 30,000 and a functionality of 2.0 to 2.4. This is then mixed with a polyisocyanate in the NCO/OH ratio of 0.6 to 1.0 and thus reacted to form the desired product. With regard to use as a base elastomer of a thermally vulcanizable pressure-sensitive adhesive tape produced in a solvent-free compounding and coating process, such a product has the drawback of either being crosslinked and therefore unsuitable for a coating process, or in cases where one operates within the limits specified in the document in a very low NCO/OH ratio, with the result that no crosslinking takes place, being liquid at room temperature and thus also unsuitable as a base elastomer for a coating process.

U.S. Pat. No. 3,743,617A (Kest) discloses polyurethane pressure-sensitive adhesives based on the reaction product of diene polymers carrying isocyanate-reactive groups with isocyanate components in the presence of tackifier resins. A drawback in this case is the absolute requirement for the presence of tackifier resins, which can have a detrimental effect on the adhesion properties of an adhesive tape produced therefrom after vulcanization. Moreover, the document does not mention the question of whether and how a tacky elastomer with a suitable melting or softening range for use in a solvent-free compounding and coating process can be produced on this basis.

U.S. Pat. No. 3,515,773A (Continental) proposes reaction-hydroxylated polybutadienes with aromatic isocyanates or with precursor products based on aromatic isocyanates for the production of pressure-sensitive adhesives and at the same time points out that tackiness can be achieved without using tackifier resins and plasticizers. The drawback of this method is its use of aromatic isocyanates, because of the possible particular risks to health that are caused by this class of substances. This document also says nothing about the question of whether and how a tacky elastomer having a suitable melting or softening range for use in a solvent-free compounding and coating process can be produced on this basis.

WO 1998030648 A1 (Shell) describes thermoplastic polyurethane pressure-sensitive adhesives based on hydrogenated polydiene diols and monools. With regard to the objective of finding a tacky, meltable base elastomer for a thermally vulcanizable pressure-sensitive adhesive tape, these adhesives have the drawback of not being thermally vulcanizable.

Figure 1:
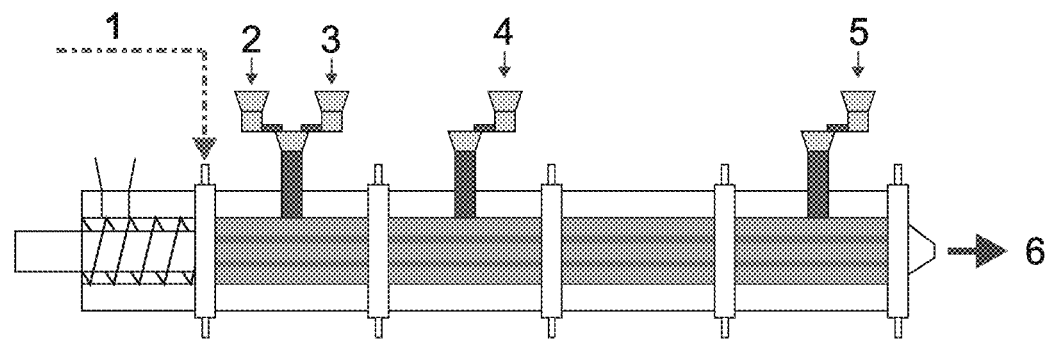
FIG. 1 depicts a schematic of a planetary roller extruder, useful with the process of the invention in producing compositions according to the invention.

The object of the invention is to provide a tacky elastomer that is thermally vulcanizable and can be processed as a melt in a compounding and extrusion process in a temperature range that is at least 30° C., and preferably at least 50° C. below the starting temperature of the vulcanization reaction. At room temperature, the tacky elastomer must be sufficiently solid or highly viscous that it can be wound as a film coated onto a release liner or a carrier material into a roll without flowing out to the sides or being squeezed out by the winding pressure.

This object is achieved by means of a hydroxyl-functionalized polybutadiene polyurethane hotmelt prepolymer, comprising the chemical reaction product of at least one polybutadiene diol, at least one chain extender having a hydroxyl functionality of two and a molecular weight of less than or equal to 300 g/mol and optionally at least one polybutadiene polyol with a number-average mean functionality between greater than 2.0 and less than or equal to 3.0 with at least one aliphatic or alicyclic diisocyanate.

The hydroxyl-functionalized polybutadiene polyurethane hotmelt prepolymer is also characterized in particular in that it can be obtained by reacting at least one polybutadiene diol and at least one chain extender having a hydroxyl functionality of two and a molecular weight of less than or equal to 300 g/mol with at least one aliphatic or alicyclic diisocyanate.

In a particularly suitable manner, such hydroxyl-functionalized polybutadiene polyurethane hotmelt prepolymers according to the invention have a solid consistency and are tacky at room temperature, can also be processed as a melt in a compounding and extruding process in a temperature range between approximately 40° C. and 100° C. and are thermally vulcanizable, in particular in a temperature range of up to 230° C.

Polymers or prepolymers that have the property of being meltable and thus thermoplastically processable are referred to in this document, as is the common practice in the speech of the person having ordinary skill in the art, as hotmelts.

In this document, a hydroxyl-functionalized polyurethane hotmelt prepolymer refers to a meltable reaction product produced in a non-stoichiometric polyaddition reaction from polyols and diisocyanates with an excess number of hydroxyl groups, which at room temperature is solid and dimensionally stable to such a degree that compounding at room temperature in known mixing assemblies (and in particular, shaping or similar processing steps as well) is not possible without adding solvents, thinning agents, or other additives that reduce viscosity. Examples of known mixing assemblies are kneaders, internal mixers, extruders, planetary roller extruders, planetary mixers, butterfly mixers or dissolvers. Within the meaning of this document, a meltable reaction product can only be processed if the meltable reaction product is heated, wherein the heat can be supplied externally by means of a heater or produced by shearing. Typical processing temperatures for meltable reaction products within the meaning of this document are in the range of 50° to 100° C., and at least 40° C. The term room temperature in this document refers to the temperature range of 20° C. to 25° C., and ideally 23° C.

A meltable reaction product within the meaning of this document has a complex viscosity, measured with a rheometer in an oscillation test applying sinusoidally oscillating shear stress in a plate-plate arrangement, at a temperature of 23° C. and an oscillation frequency of 10.0 rad/s, of at least 3,000 Pa·s, preferably at least 6,000 Pa·s, and ideally at least 10,000 Pa·s. At temperatures in the range between 40° C. and 100° C. and an oscillation frequency of 10.0 rad/s, the complex viscosity decreases to less than 1,000 Pa·s, preferably less than 500 Pa·s, and ideally less than 200 Pa·s. The oscillation frequency is equivalent to the angular frequency. Complex viscosity $\eta^*$ is defined as follows: $\eta^* = G^*/\omega$ ($G^*$=complex shear modulus, $\omega$=angular frequency).

The further definitions are as follows: $G^* = \sqrt{(G')^2 + (G'')^2}$ ($G''$=viscosity modulus (loss modulus), $G'$=elasticity modulus (storage modulus)).

$G'' = \tau/\gamma \cdot \sin(\delta)$ ($\tau$=shear stress, $\gamma$=deformation, $\delta$=phase angle=phase shift between shear stress and deformation vector).

$G' = \tau/\gamma \cdot \cos(\alpha)$ ($\tau$=shear stress, $\gamma$=deformation, $\delta$=phase angle=phase shift between shear stress and deformation vector).

$\omega = 2\pi \cdot f$ ($f$=frequency).

Pressure-sensitive tack is the property of a substance of forming a lasting bond with an adhesion base on application of only relatively weak pressure. Substances possessing this property are referred to as pressure-sensitive adhesives. Pressure-sensitive adhesives have been known for a long time. In many cases, they can be detached from the adhesion base after use leaving essentially no residue. Pressure-sensitive adhesives are as a rule permanently self-adhesive at room temperature, i.e. they show a certain viscosity and initial tack, so that they moisten the surface of the respective adhesion base on application of only minimal pressure. The capacity of a pressure-sensitive adhesive to adhere to materials and transmit forces is based on the adhesion capacity and the cohesion of the pressure-sensitive adhesive.

Pressure-sensitive adhesives can be considered to be extremely high-viscosity liquids having an elastic component. Accordingly, pressure-sensitive adhesives have particular characteristic viscoelastic properties that lead to lasting self-adhesiveness and stickiness.

Characteristic of these adhesives is that when they are mechanically deformed, this results both in viscous flow processes and in the build-up of elastic restoring forces. The two processes are in a particular ratio to each other with respect to their respective components, depending both on the exact composition, the structure, and the degree of crosslinking of the respective pressure-sensitive adhesive and on the speed and duration of deformation and on the temperature.

Proportionate viscous flow is necessary for achieving adhesion. It is only the viscous components, produced by macromolecules having relatively high mobility, that allow favourable properties of wetting and flowing onto the substrate to be bonded. A high proportion of viscous flow leads to high intrinsic adhesion (also referred to as tack or surface tack) and thus often to high adhesive strength as well. Because they lack flowable components, strongly-crosslinked systems and crystalline or glass-like hardened polymers are ordinarily not or only slightly tacky.

Proportionate elastic restoring forces are necessary to achieve adhesion. They are caused for example by extremely long-chain, strongly entangled and physically or chemically crosslinked macromolecules and enable the transfer of the forces acting on an adhesive bond. They allow an adhesive bond to withstand a permanent load acting on it, for example in the form of a permanent shear stress, to a sufficient degree over a prolonged period of time.

For more precise description and quantitation of the elastic and viscous component and the ratio of the components to each other, it is possible to use the parameters of storage modulus (G') and loss modulus (G''), which can be determined by dynamic mechanical analysis (DMA). G' is a measure of the elastic component, and G'' a measure of the viscous component of a substance. Both parameters depend on the deformation frequency and the temperature.

The parameters can be determined using a rheometer. The material to be tested is exposed in a plate-plate arrangement to a sinusoidally oscillating shear stress for example in the form of a plane-parallel layer. In shear-stress-controlled devices, the deformation is measured as a function of time, and the time offset of this deformation is measured with respect to application of the shear stress. This time offset is referred to as phase angle $\delta$.

The storage modulus G' is defined as follows: $G' = (\tau/\gamma) \cdot \cos(\delta)$ ($\tau$=shear stress, $\gamma$=deformation, $\delta$=phase angle=phase shift between shear stress and deformation vector). The definition of the loss modulus G'' is as follows: $G'' = (\tau/\gamma) \cdot \sin(\delta)$ ($\tau$=shear stress, $\gamma$=deformation, $\delta$=phase angle=phase shift between shear stress and deformation vector).

A substance and the layer produced therefrom are generally considered to be tacky and are taken as tacky within the meaning of this document if at room temperature, defined here as 23° C., in the deformation frequency range of $10^0$ to $10^1$ rad/sec, G' is at least partially in the range of $10^3$ to $10^7$ Pa and G'' is also at least partially within this range. The term partially means that at least one section of the G' curve is within the window described by the deformation frequency range of 100 rad/sec inclusively to $10^1$ rad/sec inclusively (abscissa) and the range of G' values of $10^3$ Pa inclusively to $10^7$ Pa inclusively (ordinate), and if at least a section of the G' curve is also within this window.

Within this range, which can also be referred to in a matrix plot of G' and G" (G' plotted as a function of G") as a viscoelastic window for pressure-sensitive adhesive application or as a pressure-sensitive adhesive window according to viscoelastic criteria, there are in turn various sectors and quadrants that further characterize the pressure-sensitive adhesive properties to be expected of the respective substances in question. For example, substances with a high G" and a low G' within this window are generally characterized by high adhesive strength and low shear strength, while substances with a high G" and a high G' are characterized both by high adhesive strength and by high shear strength.

The findings on the connections between rheology and pressure-sensitive tack are generally part of the prior art and are described for example in "Satas, Handbook of Pressure Sensitive Adhesive Technology, Third Edition, (1999), pp. 153 to 203".

A polybutadiene diol is understood in this document to refer to all hydroxyl-functionalized polybutadienes whose number-average mean hydroxyl functionality is two or somewhat less than two, but at least 1.5, and preferably at least 1.8. In no case is the number-average mean hydroxyl functionality of a polybutadiene diol greater than two.

Chain extenders within the meaning of this document are all compounds carrying hydroxyl groups having a hydroxyl functionality of two and a molecular weight of less than or equal to 300 g/mol. They carry no further isocyanate-reactive groups. They are therefore diols with a molecular weight of less than or equal to 300 g/mol. As is known, many chain extenders used for producing polyurethanes based on polyester or polyether are not compatible with polybutadiene diols and polyols. Separations from the mixture occur. Preferred according to the invention are the chain extenders that are compatible with polybutadiene diols and polyols. These are for example N,N-diisopropanol aniline (CAS no. 003077-13-2), 2,2,4-trimethyl-1,3-pentanediol (CAS no. 144-19-4) and 2-butyl-2-ethyl-1,3-propanediol (CAS no. 115-84-4). Particularly preferred is 2-ethyl-1,3-hexane diol (CAS no. 94-96-2). The findings on the chain extenders compatible with polybutadiene diols and polyols are part of the prior art. These findings are published for example in Herbert Chao, Nan Tian, Cray Valley, USA, LLC, Exton, Pa., PCI, April 2010.

In order to achieve high intrinsic adhesiveness (high tack) while simultaneously preventing excessive softness of the hydroxyl-functionalized polybutadiene polyurethane hotmelt prepolymer, which would result in reduced shear strength, it is advantageous if the numerical proportion of hydroxyl groups introduced in order to form the hydroxyl-functionalized polyurethane hotmelt prepolymer that originate from the at least one chain extender is between greater than or equal to 20.0% and less than or equal to 80.0%, preferably between greater than or equal to 30.0% and less than or equal to 70.0%. The numerical proportion is equivalent to the mole fraction in all cases.

The optional at least one polybutadiene polyol is a hydroxyl-functionalized polybutadiene with a number-average mean hydroxyl functionality between greater than 2.0 and less than or equal to 3.0.

The term number-average mean hydroxyl functionality is understood to refer to the mean number of hydroxyl groups per molecule of a polyol. In this document, it is based on the number-average mean molecular weight of the respective polyol and is calculated according to the following formula:

$$f = M_n [g/mol] \times OHZ [mmol\ OH/kg]/10^6$$

f is the number-average mean hydroxyl functionality. $M_n$ is the number-average mean molecular weight of the respective polyol in units of [g/mol] and OHZ is the hydroxyl number of the polyol in units of [mmol OH/kg].

The hydroxyl number is a measure of the content of hydroxyl groups in a polyol.

Here, determination of the hydroxyl number is carried out according to DIN 53240. According to this method, the hydroxyl number (OHZ) is given in units of [mg KOH/g]. It corresponds to the amount of KOH in [mg] that is equivalent to the amount of acetic acid taken up in acetylation of 1 g of polyol. In order to simplify calculation of the formulations, the hydroxyl number will be converted in this document into units of [mmol OH/kg].

This is carried out according to the following formula:

$$OHZ\ [mmol\ OH/kg] = OHZ[mg\ KOH/g] \times 1000/56.1.$$

Where 56.1 is the molecular weight of KOH.

The hydroxyl groups of the polybutadiene diols and polyols can be primarily or secondarily bonded to the polybutadiene chain. The butadiene units of the polybutadiene chain can be bonded in 1,4-cis or trans form or in 1,2 form to vinyl groups in the side chain or in a mixed form to one another.

Polybutadiene diols are produced by anionic polymerisation, while polybutadiene polyols with a number-average mean functionality between greater than 2.0 and less than or equal to 3.0 are produced by radical polymerisation. Polybutadiene diols are commercially available under the brand name Krasol®, and polybutadiene polyols with a number-average mean functionality between greater than 2.0 and less than or equal to 3.0 are available under the brand name Poly bd®, both kinds from Cray Valley.

In order to achieve high intrinsic adhesion (high tack), it is advantageous to use polybutadiene diols with a number-average mean molecular weight between greater than 1000 g/mol and less than 5000 g/mol, and preferably between greater than or equal to 2000 g/mol and less than or equal to 3000 g/mol.

For the same reason, the optional polybutadiene polyols with a number-average mean functionality between greater than 2.0 and less than or equal to 3.0 should also advantageously have a number-average mean molecular weight between greater than 1000 g/mol and less than 5000 g/mol, and preferably between greater than or equal to 2000 g/mol and less than or equal to 3000 g/mol.

The polybutadiene polyols with a number-average mean functionality between greater than 2.0 and less than or equal to 3.0 can optionally also be included in producing the hydroxyl-functionalized polybutadiene polyurethane hotmelt prepolymer in order to incorporate branching sites into the prepolymer. A certain degree of branching would be advantageous in that this would cause the coated prepolymer to undergo less intense softening during thermal vulcanization in the course of exposure to temperature but before initiation of the vulcanization reaction, and it would possess greater shear strength in this phase immediately prior to curing induced by vulcanization.

In including the optional polybutadiene polyol with a number-average mean functionality between greater than 2.0 and less than or equal to 3.0 for producing the hydroxyl-functionalized polybutadiene polyurethane hotmelt prepolymer, one must ensure that no gelation occurs, i.e. that the degree of branching in a ratio to the length of the prepolymer chain produced is not so high that this results in crosslinking during prepolymer production.

The degree of branching is adjusted such that the meltability of the hydroxyl-functionalized polybutadiene polyurethane hotmelt prepolymer is guaranteed, i.e. such that no crosslinked structures are formed. In order to exclude the possibility of crosslinked structures, one must not exceed the so-called gel point. The theoretical gel point can be calculated using the gel point equation of P. J. Flory. A formula derived from the Flory equation for estimating the NCO/OH ratio of gelation in reactions forming polyurethane from diols and triols with a deficiency of diisocyanates is as follows:

$$\left[\frac{NCO}{OH}\right]_{gelation} = \frac{1}{1 + \frac{1}{\frac{(diol\text{-}OH)}{(triol\text{-}OH)} + 1}}$$

In this formula, diol-OH indicates the total number of hydroxyl groups participating in the prepolymer formation reaction that are derived from polyols having a hydroxyl functionality of less than or equal to two. This also includes the chain extenders. Triol-OH indicates the total number of hydroxyl groups participating in the prepolymer formation reaction that are bonded to polyols having a functionality of greater than two and less than or equal to three.

If the gelation NCO/OH ratio is reached or exceeded, one must expect the formation of crosslinked structures, i.e. the onset of gelation. The formula provides a reference point that is only approximate, but as a rule is sufficient for use in industry, indicating the NCO/OH ratio at which actual gelation will occur.

The numerical proportion of the hydroxyl groups introduced for forming the hydroxyl-functionalized polybutadiene polyurethane hotmelt prepolymer that are derived from the optional polybutadiene polyol/optional polybutadiene polyols with a number-average mean functionality between greater than 2.0 and less than or equal to 3.0 should advantageously be a maximum of 50.0%, preferably a maximum of 30.0%, and particularly preferably a maximum of 10%. Greater proportions require a disadvantageously low NCO/OH ratio, which would result in a disadvantageously low softening temperature of the hydroxyl-functionalized polybutadiene polyurethane hotmelt prepolymer. With regard to process reliability, the proportion should most particularly advantageously be 0.0%. At a proportion of 0.0%, the risk of premature formation of structures, i.e. the onset of gelation during prepolymer production, is the lowest.

The hydroxyl-functionalized polybutadiene polyurethane hotmelt prepolymer is obtained by reacting the aforementioned diols/polyols with at least one aliphatic or alicyclic diisocyanate.

In this document, the term aliphatic or alicyclic diisocyanates is understood to refer to all organic polyisocyanates with an isocyanate functionality of two in which the isocyanate groups are not directly bonded to an aromatic cyclic molecule following Hückel's rule.

Examples of aliphatic or alicyclic diisocyanates are butane-1,4-diisocyanate, tetramethoxybutane-1,4-diisocyanate, hexane-1,6-diisocyanate, ethylene diisocyanate, 2,2,4-trimethyl-hexamethylene diisocyanate, ethyl ethylene diisocyanate, dicyclohexylmethane-4,4'-diisocyanate (H12MDI), 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3 trimethyl cyclohexane, 5-isocyanato-1-(4-isocyanatobut-1-yl)-1,3,3-trimethylcyclohexane, 1-isocyanato-2-(3-isocyanatoprop-1-yl)-cyclohexane, 1-isocyanato-2-(2-isocyanatoeth-1-yl)-cyclohexane, 2-heptyl-3,4-bis(9-isocyanatononyl)-1-pentylcyclohexane, norbomane diisocyanatomethyl and m-tetramethyl xylene diisocyanate (TMXDI). Particularly preferred are isophorone diisocyanate (CAS no. 4098-71-9) and dicyclohexylmethane-4,4'-diisocyanate (CAS no. 5124-30-1).

In an advantageous embodiment, the ratio of the total number of isocyanate groups to the total number of hydroxyl groups of the substances participating in the chemical reaction for forming the hydroxyl-functionalized polybutadiene polyurethane hotmelt prepolymer is between greater than 0.65 and less than 1.0, preferably between greater than or equal to 0.70 and less than or equal to 0.975, and particularly preferably between greater than or equal to 0.75 and less than or equal to 0.95. The preferred ratios provide hotmelt prepolymers with a particularly solid consistency and simultaneous high intrinsic adhesiveness (high tack) at room temperature.

Preferably, the hydroxyl-functionalized polybutadiene polyurethane hotmelt prepolymer according to the invention comprises the chemical reaction product of only one or a plurality of polybutadiene diols, optionally one or a plurality of polybutadiene polyols with a number-average mean functionality between greater than 2.0 and less than or equal to 3.0 and one or a plurality of chain extenders having a hydroxyl functionality of two and a molecular weight of less than or equal to 300 g/mol with one or a plurality of aliphatic or alicyclic diisocyanates.

Moreover, in the chemical reaction for forming the hydroxyl-functionalized polybutadiene polyurethane hotmelt prepolymer, it is preferable for no additional other polyols or isocyanates to be involved, in particular no polyether polyols, no polyester polyols and no aromatic diisocyanates. It is assumed that in use of the hydroxyl-functionalized polybutadiene polyurethane hotmelt prepolymer according to the inventions as a base elastomer for producing a thermally vulcanizable pressure-sensitive adhesive, polyether and polyester-polyols have a detrimental effect on adhesion properties after vulcanization, in particular on adhesion properties on oiled sheet metal. It is further assumed that aromatic diisocyanates have a detrimental effect on intrinsic adhesion (tack).

The hydroxyl-functionalized polybutadiene polyurethane hotmelt prepolymer according to the invention is preferably produced without using solvents. Although the inclusion of solvents in the production process is easily possible from a technical standpoint, it normally does not provide any advantages.

For purposes of acceleration, the chemical reaction for forming the hydroxyl-functionalized polybutadiene polyurethane hotmelt prepolymer is preferably carried out with addition of a catalyst. One or a plurality of catalysts known to the person having ordinary skill in the art can be used, such as e.g. tertiary amines or organobismuth or organotin compounds, to name only a few. Bismuth- and carbon-containing catalysts can be highly advantageously used, preferably a bismuth carboxylate or a bismuth carboxylate derivative. Particularly advantageous is bismuth trineodecanoate (CAS no. 34364-26-6).

The concentration of the catalysts is adjusted to the desired reaction rate and is typically between 0.01 wt % and 0.5 wt % of the hydroxyl-functionalized polybutadiene polyurethane hotmelt prepolymer to be produced.

In a possible embodiment, the hydroxyl-functionalized polybutadiene polyurethane hotmelt prepolymer comprises one or a plurality of further formulating components such as e.g. fillers, microspheres, tackifier resins, plasticizers, bitumen, anti-aging agents (antioxidants), light stabilizers, UV absorbers, rheological additives, and other auxiliaries and additives.

Both reinforcing fillers, such as e.g. carbon black, and non-reinforcing fillers, such as e.g. carbonates, in particular chalk, or sulfates, in particular barium sulfate, can be used. Further examples are silicates such as talc or mica, hydroxides or oxides such as quartz powder, aluminium hydroxide, zinc oxide or calcium oxide. Microspheres can be solid glass microspheres, hollow glass microspheres and/or plastic microspheres of all types. Plastic microspheres may be pre-expanded or unexpanded. Their particle size in an expanded state is usually in the range of 20 to 150 µm. Mixtures of the aforementioned substances can also be used.

Tackifier resins are all known adhesion-imparting resins, for example rosins, polyterpene resins, hydrocarbon resins or terpene phenolic resins. Examples of plasticizers are phthalates such as diethylhexyl phthalate or diisononyl phthalate, dibenzoates, alkylsulfonic acid esters of phenol, 1,2-cyclohexane dicarboxylic diisononyl ester or triethyl citrate. Mineral oils are also examples of plasticizers. Particularly suitable are paraffins and naphthenic oils.

The use of antioxidants can be advantageous, but is not absolutely necessary. Examples of suitable antioxidants include sterically hindered phenols, hydroquinone derivatives, amines, organic sulfur compounds or organic phosphorus compounds.

Light stabilizers and UV absorbers can also optionally be used. Examples of light stabilizers that can be used include the compounds published in Gaechter and Müller, Taschenbuch der Kunststoff-Additive [Pocketbook of Plastic Additives], Munich 1979, Kirk-Othmer (3rd Edition) 23, pp. 615 to 627, Encycl. Polym. Sci. Technol. 14, pp. 125 to 148 and Ullmann (4th Edition) 8, 21; pp. 15, 529, 676.

Examples of rheological additives that can optionally be added include pyrogens, hydrophobized or non-hydrophobized silicas, phyllosilicates (bentonites), high-molecular-weight polyamide powders or powdered castor oil derivatives.

The chemical reaction for forming the hydroxyl-functionalized polybutadiene polyurethane hotmelt prepolymer can advantageously be carried out in the presence of one or a plurality of epoxy resins. Here, the term epoxy resin is understood to refer to synthetic resins carrying epoxy groups. Advantageous are bisphenol-based, in particular bisphenol A-based, but also bisphenol F-based epoxy resins. Particularly advantageous is an epoxy resin that is liquid at room temperature, in particular the reaction product bisphenol A epichlorohydrin with a number-average mean molecular weight of less than or equal to 700 g/mol (CAS no. 25068-38-6). Other advantageous epoxy resins are epoxy-phenol novolac resins, epoxy dicyclopentadiene phenol-novolac resins, epoxy cresol-novolac resins, glycidyl amine-based epoxy resins, in particular triglycidyl ether of para-aminophenol, triglycidyl ether of meta-aminophenol, tetraglycidyl ether of methylene dianiline, hydroxyphenyl-based epoxy resins and aliphatic, in particular cycloaliphatic epoxy resins. To be mentioned here in particular is 3,4-epoxycyclohexylmethyl-3',4'-epoxycyclohexane carboxylate (CAS no. 2386-87-0).

An advantageous concentration of the epoxy resin in the hydroxyl-functionalized polybutadiene polyurethane hotmelt prepolymer is between 5 wt % inclusively and 40 wt % inclusively. Particularly advantageous is a concentration between 10 wt % inclusively and 30 wt % inclusively.

The hydroxyl-functionalized polybutadiene polyurethane hotmelt according to the invention prepolymer is advantageously used as a base elastomer for producing a thermally vulcanizable pressure-sensitive adhesive and/or a thermally vulcanizable pressure-sensitive adhesive layer or a thermally vulcanizable pressure-sensitive adhesive tape. The product properties of the hydroxyl-functionalized polybutadiene polyurethane hotmelt prepolymer according to the invention are particularly advantageously suited for the production of a thermally vulcanizable pressure-sensitive adhesive layer or a thermally vulcanizable pressure-sensitive adhesive tape in a solvent-free, continuous compounding and coating process. The addition of vulcanization materials such as e.g. sulfur or sulfur-donating substances or vulcanization accelerators such as e.g. 2,2'-dibenzothiazyl disulfide (MBTS), tetrabenzythiuram disulfide (TBzTD) or zinc-bis(dibenzyldithiocarbamate (ZBEC) and vulcanization auxiliaries and additives such as e.g. zinc oxide, fatty acids or salts thereof to the polybutadiene polyurethane hotmelt prepolymer-optionally containing epoxy resins and/or other components—is preferably carried out during the continuous compounding and coating process, and particularly preferably by metering into a continuously-operating mixing assembly, in particular a compounding extruder. The above-mentioned further formulating components of the hydroxyl-functionalized polybutadiene polyurethane hotmelt prepolymer, such as e.g. fillers, microspheres, tackifier resins, plasticizers, bitumen, anti-aging agents (antioxidants), light stabilizers, UV absorbers, rheological additives, and other auxiliaries and additives can also be advantageously metered into a continuously-operating mixing assembly, in particular a compounding extruder. In a preferred use, the thermally vulcanizable pressure-sensitive adhesive layer or the thermally vulcanizable pressure-sensitive adhesive tape is further processed into thermally vulcanizable, tacky polyurethane moulded bodies or punched blanks.

The production of the hydroxyl-functionalized polybutadiene polyurethane hotmelt prepolymer is preferably carried out batchwise (i.e. discontinuously), for example in a heatable mixing vessel, a kneader, a planetary mixer or a dissolver. In order to eliminate bubbles, mixing is preferably carried out under reduced pressure.

High concentrations of the vulcanization accelerators reduce the curing temperature, but also increase the risk that curing (vulcanization) will begin during processing. If the curing temperature of the adhesive is below 130° C., it is preferable for compounding in the extruder to use as a compounding extruder a planetary roller extruder, as this allows the compounding temperatures to be kept below 90° C., and particularly preferably below 80° C.

The hydroxyl-functionalized polybutadiene polyurethane hotmelt prepolymer according to the invention shows an outstanding combination of product properties that could not have been foreseen even by the person having ordinary skill in the art.

The prepolymer according to the invention is intrinsically adhesive (tacky) without requiring the addition of a tackifier resin. It adheres both to galvanized and ungalvanized steel and to cataphoretically dip-coated sheet metals, as well as other coated substrates. It is further characterized by its capacity to absorb process oils, so that it adheres well even to the oiled sheet metals used in constructing base structures in the automotive industry. Surprisingly, it has been found that when the optional polybutadiene polyols with a number-average mean functionality between greater than 2.0 and less than or equal to 3.0 are included within the proportional limits indicated, this improves the intrinsic adhesion (tack) of the prepolymer according to the invention.

The prepolymer according to the invention is sufficiently solid or highly viscous at room temperature that it can be wound as a film coated onto a release liner or a carrier material into a roll without flowing out to the sides or being squeezed out by the winding pressure. In the temperature range between 40° C. and 100° C., the viscosity of the prepolymer according to the invention decreases to such an extent that it can be processed in a continuous or also discontinuous compounding and coating process. Vulcanization materials such as e.g. sulfur, vulcanization accelerators and vulcanization auxiliaries and additives can be homogeneously mixed in without initiating the vulcanization reaction. The prepolymer according to the invention mixed with vulcanizing materials such as e.g. sulfur, vulcanization accelerators and vulcanization auxiliaries and additives is stable at room temperature and at temperatures of up to 40° C. over a period of at least a year. It cures in the temperature range between 130° C. and 230° C. within a short time (approximately 5 to 30 min depending on the accelerator system used) and can thus be used as the base elastomer of a thermally curable adhesive tape. As it is briefly converted into a highly-viscous liquid state before completion of curing, this allows gap-filling properties to be achieved. In addition to many other substances, suitable substrates include in particular oiled and non-oiled steel sheets, which can be galvanized or ungalvanized. Further suitable materials include sheets of other metals, such as e.g. aluminium and coated, in particular cataphoretically coated, sheet metals. As a rule, the adhesion is so favourable that cohesive failure occurs within the adhesive tape. The degree of strength can be controlled over a broad range by means of the sulfur concentration and can be adjusted to any desired level between greater than 0 N/mm$^2$ and approximately 30 N/mm$^2$.

As the prepolymer according to the invention is solvent-free, layers thereof of any desired thickness can be produced without the accompanying adverse effect of bubble formation.

In cases where the prepolymer according to the invention is used as a base elastomer for producing a thermally vulcanizable pressure-sensitive adhesive, epoxy resins can provide particular advantages as additive components of the prepolymer according to the invention. By adding an epoxy resin, it is possible to improve the adhesion properties, in particular adhesion to oiled sheet metals after the thermal vulcanization reaction.

Advantageously, the chemical reaction for forming the hydroxyl-functionalized polybutadiene polyurethane hotmelt prepolymer is carried out in the presence of one or a plurality of epoxy resins. The advantage of this method is that the at least one epoxy resin can be incorporated at room temperature in an energy-saving manner. In contrast, if the hydroxyl-functionalized polybutadiene polyurethane hotmelt prepolymer were first produced and the epoxy resin/epoxy resins was/were then added, it would be necessary first to heat the polybutadiene polyurethane hotmelt prepolymer to such a high temperature that it would be present as a melt. This would be disadvantageous because higher energy input would be required. In cases where the hydroxyl-functionalized polybutadiene polyurethane hotmelt prepolymer is used as a base elastomer for producing a thermally vulcanizable pressure-sensitive adhesive, the chemical reaction for forming the hydroxyl-functionalized polybutadiene polyurethane hotmelt prepolymer carried out in the presence of one or a plurality of liquid epoxy resins in particular is further advantageous in that the softening or melting temperature of the mixture of the prepolymer and the epoxy resin is significantly lower than the softening or melting temperature of the pure prepolymer, but with the hotmelt character of the prepolymer being retained. Subsequent compounding with further substances, such as e.g. vulcanization materials, auxiliaries, and accelerators can thus be carried out in a more energy-saving and gentler manner and at lower temperatures than if the epoxy resin were not incorporated during prepolymer production. In this manner, it is possible to carry out compounding with so-called ultra-accelerators, which initiate vulcanization at temperatures of only approximately 120° C. within a few minutes, without causing undesirable curing or gelation during the compounding process. If the subsequent compounding of the polybutadiene polyurethane hotmelt prepolymer is carried out with vulcanization materials, vulcanization accelerators and vulcanization auxiliaries and additives in a continuously-operating mixing assembly, in particular a compounding extruder, this provides a further advantage in that none of the dosing sites on the compound extruder, which as a rule are accessible only to a limited extent, will be blocked by the at least one epoxy resin.

The fact that it is technically possible to allow the isocyanate-based chemical reaction for forming the hydroxyl-functionalized polybutadiene polyurethane hotmelt prepolymer to take place in the presence of one or a plurality of epoxy is surprising to the person having ordinary skill in the art, as isocyanates are described in the technical literature as being reactive with respect to epoxides, for example in Ullmann's Encyclopedia of Industrial Chemistry, 6th Edition, Vol. 12, pg. 271 (table) and in Encyclopedia of Polymer Science and Engineering, Vol. 6, pg. 345.

Moreover, it has surprisingly been found that mixtures of the epoxy resin and the hydroxyl-functionalized polybutadiene polyurethane hotmelt prepolymer tend to undergo phase separation if the epoxy resin/epoxy resins is/are not added until after production of the hydroxyl-functionalized polybutadiene polyurethane hotmelt prepolymer. In contrast, if the chemical reaction for forming the hydroxyl-functionalized polybutadiene polyurethane hotmelt prepolymer is carried out in the presence of the at least one epoxy resin, homogenous mixtures are obtained that are advantageous for producing a thermally vulcanizable pressure-sensitive adhesive because they vulcanize (cure) homogeneously, making it possible to achieve greater strength and improved adhesion compared to the use of a heterogeneous mixture of a prepolymer and an epoxy resin.

In a similar manner, other substances, such as e.g. plasticizers or bitumen, as well as fillers or rheological additives can advantageously be added before or during the chemical reaction for forming the hydroxyl-functionalized polybutadiene polyurethane hotmelt prepolymer.

If tackifier resins are added to the mixture, they should preferably not be added until during the compounding process, rather than before or during the chemical reaction for forming the hydroxyl-functionalized polybutadiene polyurethane hotmelt prepolymer, because these resins, particularly when added in a high concentration, can adversely increase the viscosity of the prepolymer and thus make the further processing steps up to the compounding process, in particular pumping and conveying, more difficult.

The present invention further relates to an adhesive tape that is at least partially coated with the pressure-sensitive adhesive according to the invention on one or both sides. The adhesive tape can also be a transfer adhesive tape. An adhesive tape allows particularly simple and precise bonding and is therefore particularly suitable.

The general term "adhesive tape" includes a carrier material that is at least partially provided with a (pressure-sensitive) adhesive on one or both sides. The carrier material includes all flat structures, for example films or film sections extending in two dimensions, tapes of extended length and limited width, tape sections, blanks (for example in the form of borders or boundaries of a device to be bonded), other moulded bodies, multilayer arrangements and the like. A wide variety of carriers, such as e.g. films, fabrics, webs and papers can be combined with the adhesives for various applications. The term "adhesive tape" also includes so-called "transfer adhesive tapes", i.e. adhesive tapes without carriers. In a transfer adhesive tape, the adhesive is placed between flexible liners provided with a release layer and/or having anti-adhesive properties prior to application. For application, a liner is ordinarily first removed, the adhesive is applied, and the second liner is then removed. In this manner, the adhesive can be directly used to bond two surfaces together.

However, adhesive tapes are also possible that are equipped with a single liner that has a release effect on both sides rather than two liners. In this case, the adhesive tape web is covered on its upper side with one side of a liner having a two-sided separating effect and covered on its underside with the reverse side of the liner having a two-sided separating effect, in particular an adjacent coil on a ball or a roller.

For specified applications, it may be desired to leave partial adhesive-free areas on the adhesive tape rather than completely covering one or both sides of the adhesive tape with adhesive, for example in order to account for recesses in the surfaces to be bonded.

Here, as a carrier material for an adhesive tape, one preferably uses polymer films, film composites or films or film composites provided with organic and/or inorganic layers, wherein films, in particular dimensionally stable plastic or metal films, are preferred. Such films/film composites can be composed of all plastics commonly used for film production, with the following being mentioned as non-limitative examples:

Polyethylene, polypropylene—in particular oriented polypropylene (OPP), which is produced by mono- or biaxial stretching, cyclic olefin copolymers (COC), polyvinylchloride (PVC), polyester—in particular polyethylene terephthalate (PET) and polyethylene naphthalate (PEN), ethylene vinyl alcohol (EVOH), polyvinylidene chloride (PVDC), polyvinylidene fluoride (PVDF), polyacrylonitrile (PAN), polycarbonate (PC), polyamide (PA), polyether sulfone (PES) or polyimide (PI).

Polyester films are advantageous in that they provide temperature stability and also increase mechanical stability. Most particularly preferably, therefore, a carrier layer in a liner according to the invention is composed of a polyester film, for example composed of biaxially oriented polyethylene terephthalate.

In the case of double-sided (self) tacky adhesive tapes, adhesives according to the invention of the same or different types and/or the same or different layer thicknesses can be used as the upper and lower layer. In this case, the carrier may be pre-treated according to the prior art on one or both sides, so that for example an improvement in adhesive anchoring is achieved. The pressure-sensitive adhesive layers can optionally be covered with release papers or release films. Alternatively, only one adhesive layer can be covered with a double-sided release liner.

In one variant, an adhesive according to the invention is provided in the double-sided (self) tacky adhesive tape, as well as any further desired adhesive, for example one that adheres particularly well to a covering substrate or shows particularly favourable repositionability.

The thickness of the pressure-sensitive adhesive layer, which is present either as a transfer adhesive tape or coated onto a flat structure, is preferably between 10 μm and 5000 μm, further preferably between 100 μm and 4000 μm and particularly preferably between about 200 μm and 3000 μm.

Moreover, for adhesives used in double-sided adhesive tapes, the thickness of the individual pressure-sensitive adhesive layer(s) is preferably between 10 μm and 5000 μm, further preferably between 100 μm and 4000 μm and particularly preferably between about 200 μm and 3000 μm.

In production of a pressure-sensitive adhesive tape according to the invention, compounding and coating of the thermally vulcanizable pressure-sensitive adhesive is preferably carried out free of solvents and continuously. For this purpose, compounding and coating are carried out at elevated temperatures above 30° C., preferably above 40° C. and particularly preferably between 50 and 100° C. Moreover, compounding is preferably carried out in a continuously operating mixing assembly, in particular a compounding extruder. During the solvent-free, continuous compounding process, vulcanization materials, vulcanization accelerators and vulcanization auxiliaries and additives can be added.

Adhesive tapes that are coated on one or both sides with adhesives are usually wound up into a roll in the form of an Archimedean spiral or cross-wound at the end of the production process. Before winding, the adhesive tapes are covered with a covering material (also referred to as a separating material) that is wound up with the adhesive tapes in order to prevent the adhesives from coming into contact with each other in the case of double-sided adhesive tapes or to prevent bonding of the adhesives to the carrier in the case of single-sided adhesive tapes. Such covering materials are known to the person having ordinary skill in the art as liners or release liners. In addition to covering of adhesive tapes that are tacky on one or both sides, liners are also used for covering pure adhesives (transfer adhesive tape) and adhesive tape sections (for example labels).

The invention will now be described in further detail by means of the following examples, without this being intended to limit the invention.

The following test methods were used in order to briefly characterize the samples produced according to the invention:

Dynamic Mechanical Analysis (DMA) for Determining Storage Modulus G' and Loss Modulus G"

In order to characterize the hydroxyl-functionalized polybutadiene polyurethane hotmelt prepolymers, determinations of storage modulus G' and loss modulus G" were further carried out by means of dynamic mechanical analysis (DMA).

The measurements were carried out using the shear-stress-controlled rheometer DSR 200 N from the firm Rheometric Scientific in an oscillation test applying sinusoidally oscillating shear stress in a plate-plate arrangement. Storage modulus G' and loss modulus G" were determined in a frequency sweep from $10^{-1}$ to $10^2$ rad/sec at a temperature of 25° C. G' and G" are defined as follows:

G'=τ/γ·cos(a) (τ=shear stress, γ=deformation, δ=phase angle=phase shift between shear stress and deformation vector).

G"=τ/γ·sin(6) (τ=shear stress, γ=deformation, δ=phase angle=phase shift between shear stress and deformation vector).

The definition of angular frequency is as follows: ω=2π·f (f=frequency). The unit is rad/sec.

The thickness of the measured samples was between 0.9 and 1.1 mm (1±0.1 mm) in all cases.

The respective sample diameter was 25 mm. Prestressing was carried out with a load of 3N. The stress of the test bodies was 2500 Pa in all measurements.

Dynamic Mechanical Analysis (DMA) for Determining Complex Viscosity ($\eta^*$)

In order to characterize the hydroxyl-functionalized polybutadiene polyurethane hotmelt prepolymers, determinations of complex viscosity were further carried out by means of dynamic mechanical analysis (DMA).

The measurements were carried out using the shear-stress-controlled rheometer DSR 200 N from the firm Rheometric Scientific in an oscillation test applying sinusoidally oscillating shear stress in a plate-plate arrangement. Complex viscosity was determined in a temperature sweep from −50° C. to +250° C. at an oscillation frequency of 10 rad/s. Complex viscosity $\eta^*$ is defined as follows: $\eta^*=G^*/\omega$ ($G^*$=complex shear modulus, ω=angular frequency).

The further definitions are as follows: $G^*=\sqrt{(G')^2+(G'')^2}$ (G"=viscosity modulus (loss modulus), G'=elasticity modulus (storage modulus)).

G"=τ/γ·sin(6) (τ=shear stress, γ=deformation, δ=phase angle=phase shift between shear stress and deformation vector).

G'=τ/γ *cos(O) (τ=shear stress, γ=deformation, δ=phase angle=phase shift between shear stress and deformation vector).

ω=2ω*f(f=frequency).

The thickness of the measured samples was between 0.9 and 1.1 mm (1±0.1 mm) in all cases. The respective sample diameter was 25 mm. Prestressing was carried out with a load of 3N. The stress of the test bodies was 2500 Pa in all measurements.

Tack

Measurement of adhesiveness (pressure-sensitive tack) was carried out by the rod measurement method analogously to the method of ASTM D 2979-01 using a Texture Analyser TA 2 from the firm SMS (Stable Micro Systems) at room temperature. According to this method, a cylindrical steel rod is pressed onto the sample to be tested with a specified contact force and speed, and after a specified period of time, pulled away at a specified speed. The test result is the maximum force required to withdraw the rod, given in units of N.

The individual test parameters were as follows:
Cylinder radius: 1 mm⇒Cylinder area: 3.14 mm$^2$
Contact speed: 0.1 mm/s
Contact force: 5 N
Contact time: 0.01 s
Withdrawal speed: 0.6 mm/s The thickness of the measured samples was between 0.9 and 1.1 mm (1±0/1 mm) in all cases.

Dynamic Shear Test (Tensile Shear Strength)

The dynamic shear test was carried out analogously to the method of DIN EN 1465. It was carried out after thermal vulcanization of the bonded samples in all cases. For this purpose, the hydroxyl-functionalized polybutadiene polyurethane hotmelt prepolymer according to the invention was first processed by compounding and shaping or coating into a thermally vulcanizable pressure-sensitive adhesive layer. The main substances added in compounding were sulfur and vulcanization accelerators. Moreover, in individual examples, epoxy compounds, fillers, plasticizers and further auxiliaries and additives were also mixed in.

Rectangular blanks measuring 25.0 mm×12.5 mm were punched from the thermally vulcanizable pressure-sensitive adhesive layers, which were covered on both sides with a release paper. The release papers were then peeled off one side of a blank. The thickness of the blanks was between 0.4 and 0.6 mm (0.5±0.1 mm) in all cases.

The respective blanks were placed in a precisely fitting manner on the end of a test piece (substrate) measuring 100.0 mm×25.0 mm×2.0 mm. The respective blanks then adhered to this test piece. Test pieces composed of steel, electrolytically galvanized steel, hot-galvanized steel, and cataphoretically dip-coated steel (KTL steel) were used. The designations of the uncoated steel test pieces were as follows:

Steel: DC04
Electrolytically galvanized steel: DC01ZE 25/25
Hot-galvanized steel: DX51 D+Z275

All of the above-mentioned test pieces were supplied by the firm Rocholl GmbH.

The uncoated test pieces were partially oiled before application of the blanks.

The brand name of the oil was Anticorit RP 4107 S (from the firm Fuchs), and it was applied in a thickness of 2 to 3 g/m$^2$ (see table). The release paper still remaining on the blanks was then peeled off.

After this, test pieces composed of the same material respectively were each applied flush with an end such as that described in DIN EN 1465, and a lap joint was produced in each case. The length of the lap joints was 12.5 mm respectively. The lap joint area was 300 mm$^2$ respectively. The lap joints were placed on a metal sheet, with washers being used to ensure that the upper test piece could not tip over. In each case, a weight of 2 kg was placed on the upper test piece in the area of the lap surface. The joint was exposed to the pressure of the weight for 10 sec (pressing time) at room temperature in each case. The weight was then removed. The joint was then vulcanized for 10 min or 30 min at 140° C., 180° C. or 230° C. This caused an adhesion reaction within the pressure-sensitive adhesive layer samples and the build-up of strong adhesion between the respective pressure-sensitive adhesive layer samples and the respective test pieces. The result was bonding with a significant increase in strength. After cooling and a waiting period of 2 to 3 h, tensile shear strength was determined.

Determination of the tensile shear strength of lap joints makes it possible to draw conclusions as to the shear strength of a double-sided bonding adhesive product. Determination was carried out in accordance with DIN EN 1465 using a tensile testing machine. The test speed was 10 mm/min. All measurements were carried out in an air-conditioned room at 23° C. and 50% relative humidity.

Curing Temperature

The curing temperature of reactive adhesives is calorimetrically determined by differential scanning calorimetry (DSC) according to DIN EN ISO 11357-3:2013-04. Heating curves run with a heating rate of 10 K/min. The samples are measured in Al crucibles with perforated covers under a nitrogen atmosphere. A chemical reaction is recognizable on the thermogram as an exothermic peak. The temperature at which the highest heat of reaction occurs is noted as the activation temperature (peak temperature).

Procedure

The tacky, hydroxyl-functionalized polybutadiene polyurethane hotmelt prepolymers were prepared in laboratory batches in a heatable and evacuable 1 l planetary mixer from the firm PC Laborsystem.

In each case, they were produced by first weighing the polybutadiene polyols into the mixing containers and then mixing them at a temperature of 80° C. under a vacuum for two hours while carrying out degassing to eliminate all residual moisture. The chain extender was then added and mixed in for 20 min without a vacuum. After this, the remaining substances, such as e.g. a catalyst and/or an epoxy resin and/or plasticizers and/or bitumen, were added in accordance with the quantitative proportions given in the individual examples and mixed in for 20 min. Finally, the at least one aliphatic or alicyclic diisocyanate was added and homogeneously mixed in for 30 min at a temperature of approximately 80° C. The mixing container was removed from the mixer, and the chemically reacting mixture was allowed to stand in this vessel for 7 days at 23° C. in order to complete the reaction. Following the one-week storage period, in order to produce a thermally-vulcanizable pressure-sensitive adhesive and a thermally-vulcanizable pressure-sensitive adhesive layer, further substances, such as in particular the vulcanization materials, vulcanization accelerators and vulcanization auxiliaries and additives, and optionally the fillers, plasticizers and other substances as well, were mixed in with the tacky, hydroxyl-functionalized polybutadiene polyurethane hotmelt prepolymer according to the invention produced in this manner at 70° C. to 100° C. in the same device. In order to homogeneously incorporate these substances, they were mixed in for approximately 30 min. Finally, a vacuum was applied for approx. 10 min in order to remove any stirred-in air. After this, films were produced from the mixtures in the desired thicknesses by pressing the mixtures between two glass plates covered with siliconized polyester films at approx. 80° C. After the shaping carried out in this manner, the films were cooled to room temperature, whereupon they immediately solidified.

Alternatively, some of the tacky, hydroxyl-functionalized polybutadiene polyurethane hotmelt prepolymers were heated in a conventional heatable and evacuable 200 l mixing vessel with a dissolver agitator from the firm Molteni. In each case, they were produced by first weighing in the polybutadlene polyols and mixing them under a vacuum at a temperature of 80° C. for two hours. The chain extender was then added and mixed in for 20 min without a vacuum. Next, the remaining substances, such as e.g. a catalyst and/or epoxy resin and/or a plasticizer and/or bitumen, were added according to the quantitative proportion given in the individual examples and mixed in for 20 min. Finally, the at least one aliphatic or alicyclic diisocyanate was added and homogeneously stirred in for 30 min. The chemically reacting mixtures were placed in a 200 l drum and allowed to stand for 7 days at 23° C. in order to complete the reaction.

Unless otherwise specified in detail, the tacky, hydroxyl-functionalized polybutadiene polyurethane hotmelt prepolymers according to the invention produced in this manner were pumped using a drum melt pump at 70° C.-100° C. into a twin-screw extruder from the firm Krauss Maffei Berstorff, brand name ZE30Rx54D UTXmi Extruder, in order to produce a thermally vulcanizable pressure-sensitive adhesive layer. The extruder was electrically heated from outside to approx. 70° C. to 100° C. and air-cooled by means of various blowers. It was designed to ensure thorough mixing of the prepolymer and the further substances, such as in particular the vulcanization materials, vulcanization accelerators and vulcanization auxiliaries and additives, and optionally the fillers, with a short residence time in the extruder. For this purpose, the mixing shafts of the twin-screw extruder were arranged with the conveying and mixing elements in an alternating configuration. The further substances were added by means of suitable dosing equipment using dosing auxiliaries in the pressure-free conveying zones of the twin-screw extruder.

After the mixture heated to approx. 70° C. to 100° C. was discharged from the twin-screw extruder (outlet: circular nozzle 5 mm in diameter), shaping into a film was carried out directly by means of a dual-roller applicator unit connected downstream between two 50 µm thick polyester films siliconized on both sides that were continuously fed in. The feed rate was varied between 1 m/min and 20 m/min. One of the fed-in polyester films siliconized on both sides was immediately spread out after cooling and thus solidification. The film was then wound onto a cylindrical core.

Table 1 shows the base materials (raw materials) used for producing the tacky, meltable, hydroxyl-functionalized polybutadiene polyurethane hotmelt prepolymer according to the invention, specifically with their respective brand names, manufacturer and the relevant technical data for the present invention.

Table 2 shows the base materials (raw materials) used for the thermally vulcanizable pressure-sensitive adhesive layers produced therefrom. These raw materials are all freely commercially available.

TABLE 1

Base materials (raw materials) used for producing the tacky, meltable, hydroxyl-functionalized polybutadiene polyurethane hotmelt prepolymer according to the invention and for the comparative examples

| Brand name | Description | Mean number-average molecular weight Mn (g/mol) | OH or NCO number (mmol OH/kg or mmol NCO/kg | Mean number-average functionality f | Manufacturer/supplier |
|---|---|---|---|---|---|
| Polybutadiene polyols | | | | | |
| Krasol LBH 2000 ® | Polybutadiene diol | 2100 | 910 | 1.9 | Cray Valley |

TABLE 1-continued

Base materials (raw materials) used for producing the tacky, meltable, hydroxyl-functionalized polybutadiene polyurethane hotmelt prepolymer according to the invention and for the comparative examples

| Brand name | Description | Mean number-average molecular weight Mn (g/mol) | OH or NCO number (mmol OH/kg or mmol NCO/kg | Mean number-average functionality f | Manufacturer/supplier |
|---|---|---|---|---|---|
| Krasol LBH-P 2000 ® | Polybutadiene diol, OH groups have primary bonds | 2100 | 910 | 1.9 | Cray Valley |
| Krasol LBH 3000 ® | Polybutadiene diol | 3000 | 640 | 1.9 | Cray Valley |
| Poly bd R-45 HTLO ® | Polybutadiene polyol, f greater than 2 | 2800 | 840 | 2.4 | Cray Valley |
| Polyether polyols | | | | | |
| Voranol P 2000L ® | Polypropylene glycol, diol | 2000 | 989 | 2.0 | Dow |
| Polyester polyols | | | | | |
| Desmophen 1652 ® | Polyester diol | 2120 | 941 | 2.0 | Bayer |
| Chain extenders | | | | | |
| 2-ethyl-1,3-hexane diol (EHD) | CAS no.: 94-96-2, diol | 146.2 | 13679.8 | 2.0 | Sigma-Aldrich |
| 2-butyl-2-ethyl-1,3-propanediol (BEPD) | CAS no.: 115-84-4, diol | 160.3 | 12476.6 | 2.0 | Perstorp |
| Diisocyanates | | | | | |
| Vestanat IPDI ® | Isophorone diisocyanate (IPDI), CAS no.: 4098-71-9 | 222.3 | 8998 | 2.0 | Degussa |
| Desmodur W ® | Dicyclohexylmethanediisocyanate (HMDI), CAS no.: 5124-30-1 | 262 | 7571 | 2.0 | Bayer |
| 4,4'-methylene-bis-(phenyl isocyanate) | MDI, CAS no.: 101-68-8 | 250.25 | 7992 | 2.0 | Sigma-Aldrich |
| Catalysts | | | | | |
| Coscat 83 ® | Bismuth trineodecanoate CAS no.: 34364-26-6 | | | | Caschem |
| Epoxy resins | | | | | |
| Epikote 828 ® | Reaction product of bisphenol-A and epichlorhydrin CAS no.: 25068-38-6 | | | | Brenntag |
| 3,4-epoxycyclohexyl methyl-3',4'-epoxycyclohexane carboxylate | CAS no.: 2386-87-0 | | | | Sigma-Aldrich |
| Plasticizers | | | | | |
| Palatinol N ® | Diisononylphthalate, CAS no.: 28553-12-0 | | | | BASF |
| Benzoflex 9-88 SG Plasticizer ® | Dipropylene glycoldibenzoate, CAS-no.: 27138-31-4 | | | | Eastman |
| Hexamoll ® DINCH ® | 1,2-cyclohexane dicarboxylic acid diisonyl ester, CAS no.: 166412-78-8 | | | | BASF |
| Citric acid triethyl ester | CAS no.: 77-93-0 | | | | Sigma-Aldrich |
| Gravex 925 ® | Naphthenic fabrication oil | | | | Shell |
| Bitumen | | | | | |
| Azalt 50/70 DE ® | Road bitumen according to DIN EN 12591, Table 1, softening point: 46-54° C. | | | | Total |

TABLE 2

Base materials (raw materials) used for producing the thermally vulcanizable pressure-sensitive adhesive layers from the tacky, meltable, hydroxyl-functionalized polybutadiene polyurethane hotmelt prepolymers according to the invention

| Brand name | Description | Manufacturer/supplier |
|---|---|---|
| Vulcanization materials and accelerators | | |
| Powdered sulfur 80/90° | Soluble powdered sulfur, CAS no.: 7704-34-9 | Avokal GmbH |
| MBTS | Di(benzothiazyl)disulfide, CAS no.: 120-78-5 | Weber & Schaer GmbH |
| ZBEC | Zinc bis(dibenzyldithiocarbamate), CAS no.: 14726-36-4 | Weber & Schaer GmbH |
| TBzTD | tetrabenzylthiuram disulfide, CAS no.: 10591-85-2 | Weber & Schaer GmbH |
| Carbon blacks | | |
| Luvomaxx N 220 ® | Beaded black | Lehmann & Voss |
| Printex 60 ® | Furnace black, oil absorption no: 118, BET surface area: 115 | Orion Engineered Carbons GmbH |
| Fillers | | |
| talc Pharma M ® | talc, CAS no.: 14807-96-6, spec. surface area: 4.6 m$^2$/g | Scheruhn GmbH |
| Omyacarb 5-GU ® | Ground chalk, mean particle diameter: 5.5 µm | Omya |
| Rapidquell ® Quicklime CL 90-Q | Calcium oxide, sieve residue > 90 µm: 3 wt % | Rheinkalk GmbH |

EXAMPLES

Example 1

The polybutadiene polyurethane hotmelt prepolymer according to the invention (prepolymer 1) has the following composition:

Composition of Prepolymer 1:

| Raw material | Percent by weight [wt %] | No. of introduced OH or NCO groups relative to percent by weight | Percent ratio of number of OH groups to one another |
|---|---|---|---|
| Krasol LBH 2000 ® | 77.11 | 70.17 mmol OH | 50 |
| 2-ethyl-1,3-hexane diol ® | 5.13 | 70.17 mmol OH | 50 |
| Coscat 83 ® | 0.15 | | |
| Desmodur W ® | 17.61 | 133.32 mmol NCO | |
| Total | 100.00 | | |

Laboratory batches were produced (1 l). The percent by weight of Desmodur W® is calculated such that the NCO/OH ratio of the prepolymer is 0.95. The theoretical gel point is calculated at 1.0.

Prepolymer 1 is solid, meltable, and has a rubbery and tacky consistency at room temperature. The test results are shown in the following table.

Test Results for Prepolymer 1:

| | |
|---|---|
| G' (at 1 rad/sec and 23° C.) | 200,000 Pa |
| G" (at 1 rad/sec and 23° C.) | 150,000 Pa |
| G' (at 10 rad/sec and 23° C.) | 400,000 Pa |
| G" (at 10 rad/sec and 23° C.) | 230,000 Pa |
| Tack at 23° C. | 0.3 N |
| Complex viscosity η* at 10 rad/sec and 23° C. | 46,000 Pa · s |
| Complex viscosity η* at 10 rad/sec and 90° C. | 600 Pa · s |

Use:

Prepolymer 1 was used for producing a thermally vulcanizable pressure-sensitive adhesive or a thermally vulcanizable pressure-sensitive adhesive layer and for this purpose further mixed in the following formulation in a laboratory batch.

Composition of the thermally vulcanizable pressure-sensitive adhesive composed of prepolymer 1:

| Raw material | Percent by weight |
|---|---|
| Prepolymer 1 | 87.0 |
| Ground sulfur 80/90° | 8.7 |
| MBTS | 2.5 |
| ZBEC | 0.9 |
| TBzTD | 0.9 |

The following tensile shear strengths were achieved.

Test Results for the Thermally Vulcanizable Pressure-Sensitive Adhesive Composed of Prepolymer1:

| Test piece | Oil application | Curing | Tensile shear strength [MPa] | Fracture pattern |
|---|---|---|---|---|
| Steel/steel | no | 30 min/180° C. | 6.3 | cohesive |
| Steel/steel | yes | 30 min/180° C. | 5.9 | cohesive |

-continued

| Test piece | Oil application | Curing | Tensile shear strength [MPa] | Fracture pattern |
|---|---|---|---|---|
| Electrolytically galvanized steel/electrolytically galvanized steel | yes | 30 min/180° C. | 6.1 | partially cohesive/partially adhesive |
| Hot-galvanized steel/hot-galvanized steel | yes | 30 min/180° C. | 5.4 | partially cohesive/partially adhesive |
| KTL steel/KTL steel | no | 30 min/140° C. | 5.5 | cohesive |

Example 2

The polybutadiene polyurethane hotmelt prepolymer according to the invention (prepolymer 2) has the following composition:

Composition of Prepolymer 2:

| Raw material | Percent by weight [wt %] | No. of introduced OH or NCO groups relative to percent by weight | Percent ratio of number of OH groups to one another |
|---|---|---|---|
| Krasol LBH 2000 ® | 79.33 | 72.19 mmol OH | 50 |
| 2-ethyl-1,3-hexane diol ® | 5.28 | 72.19 mmol OH | 50 |
| Coscat 83 ® | 0.15 | | |
| Vestanat IPDI ® | 15.24 | 137.16 mmol NCO | |
| Total | 100.00 | | |

Laboratory batches were produced (1 l). The percent by weight of Vestanat IPDI® is calculated such that the NCO/OH ratio of the prepolymer is 0.95. The theoretical gel point is calculated at 1.0.

Prepolymer 2 is solid, meltable, and has a rubbery and tacky consistency at room temperature. The test results are shown in the following table:

Test Results for Prepolymer 2:

| | |
|---|---|
| G' (at 1 rad/sec and 23° C.) | 170,000 Pa |
| G" (at 1 rad/sec and 23° C.) | 130,000 Pa |
| G' (at 10 rad/sec and 23° C.) | 320,000 Pa |
| G" (at 10 rad/sec and 23° C.) | 200,000 Pa |
| Tack at 23° C. | 0.5N |
| Complex viscosity η* at 10 rad/sec and 23° C. | 38,000 Pa · s |
| Complex viscosity η* at 10 rad/sec and 90° C. | 500 Pa · s |

Use:

Prepolymer 2 was used for producing a thermally vulcanizable pressure-sensitive adhesive or a thermally vulcanizable pressure-sensitive adhesive layer and for this purpose further mixed according to the following formulation in a laboratory batch:

Composition of the thermally vulcanizable pressure-sensitive adhesive composed of prepolymer 2:

| Raw material | Percent by weight |
|---|---|
| Prepolymer 2 | 87.0 |
| Ground sulfur 80/90° | 8.7 |
| MBTS | 2.5 |
| ZBEC | 0.9 |
| TBzTD | 0.9 |

The following tensile shear strengths were achieved.

Test results for the thermally vulcanizable pressure-sensitive adhesive composed of prepolymer 2:

| Test piece | Oil application | Curing | Tensile shear strength [MPa] | Fracture pattern |
|---|---|---|---|---|
| Steel/steel | no | 30 min/180° C. | 6.5 | cohesive |
| Steel/steel | yes | 30 min/180° C. | 6.3 | cohesive |
| Electrolytically galvanized steel/electrolytically galvanized steel | yes | 30 min/180° C. | 6.2 | partially cohesive/partially adhesive |
| Hot-galvanized steel/hot-galvanized steel | yes | 30 min/180° C. | 5.1 | partially cohesive/partially adhesive |
| KTL steel/KTL steel | no | 30 min/140° C. | 5.6 | cohesive |

Example 3

The polybutadiene polyurethane hotmelt prepolymer according to the invention (prepolymer 3) has the following composition:

Composition of Prepolymer 3:

| Raw material | Percent by weight [wt %] | No. of introduced OH or NCO groups relative to percent by weight | Percent ratio of number of OH groups to one another |
|---|---|---|---|
| Krasol LBH 2000 ® | 76.69 | 69.78 mmol OH | 40 |
| 2-ethyl-1,3-hexane diol ® | 7.65 | 104.68 mmol OH | 60 |
| Coscat 83 ® | 0.15 | | |
| Vestanat IPDI ® | 15.51 | 139.57 mmol NCO | |
| Total | 100.00 | | |

Laboratory batches were produced (1 l). The percent by weight of Vestanat IPDI® is calculated such that the NCO/OH ratio of the prepolymer is 0.80. The theoretical gel point is calculated at 1.0. Prepolymer 3 is solid, meltable, and has a rubbery and tacky consistency at room temperature. The test results are shown in the following table:

Test Results for Prepolymer 3:

| | |
|---|---|
| G' (at 1 rad/sec and 23° C.) | 80,000 Pa |
| G" (at 1 rad/sec and 23° C.) | 70,000 Pa |
| G' (at 10 rad/sec and 23° C.) | 130,000 Pa |
| G" (at 10 rad/sec and 23° C.) | 120,000 Pa |
| Tack at 23° C. | 0.6N |
| Complex viscosity η* at 10 rad/sec and 23° C. | 18,000 Pa · s |
| Complex viscosity η* at 10 rad/sec and 90° C. | 400 Pa · s |

Use:

Prepolymer 3 was used for producing a thermally vulcanizable pressure-sensitive adhesive or a thermally vulcanizable pressure-sensitive adhesive layer and for this purpose further mixed in the following formulation in a laboratory batch:

Composition of the thermally vulcanizable pressure-sensitive adhesive composed of prepolymer 3:

| Raw material | Percent by weight |
|---|---|
| Prepolymer 3 | 87.0 |
| Ground sulfur 80/90° | 8.7 |
| MBTS | 2.5 |
| ZBEC | 0.9 |
| TBzTD | 0.9 |

The following tensile shear strengths were achieved.

Test results for the thermally vulcanizable pressure-sensitive adhesive composed of prepolymer 3:

| Test piece | Oil application | Curing | Tensile shear strength [MPa] | Fracture pattern |
|---|---|---|---|---|
| Steel/steel | no | 30 min/180° C. | 6.9 | cohesive |
| Steel/steel | yes | 30 min/180° C. | 6.2 | cohesive |
| Electrolytically galvanized steel/electrolytically galvanized steel | yes | 30 min/180° C. | 6.2 | partially cohesive/partially adhesive |
| Hot-galvanized steel/hot-galvanized steel | yes | 30 min/180° C. | 6.5 | partially cohesive/partially adhesive |
| KTL steel/KTL steel | no | 30 min/140° C. | 6.1 | cohesive |

Example 4

The chemical reaction for forming the polybutadiene polyurethane hotmelt prepolymer according to the invention was carried out in the presence of an epoxy resin. The polybutadiene polyurethane hotmelt prepolymer according to the invention (prepolymer 4) has the following composition, including the epoxy resin:

Composition of Prepolymer 4 Including Epoxy Resin:

| Raw material | Percent by weight [wt %] | No. of introduced OH or NCO groups relative to percent by weight | Percent ratio of number of OH groups to one another |
|---|---|---|---|
| Krasol LBH 2000 ® | 61.67 | 56.12 mmol OH | 50 |
| 2-ethyl-1,3-hexane diol ® | 4.10 | 56.12 mmol OH | 50 |
| Coscat 83 ® | 0.15 | | |
| Desmodur W ® | 14.08 | 106.62 mmol NCO | |
| Epikote 828 ® | 20.00 | | |
| Total | 100.00 | | |

Production was carried out in a 200 l mixing vessel. The percent by weight of Desmodur W® is calculated such that the NCO/OH ratio of the prepolymer is 0.95. The theoretical gel point is calculated at 1.0.

Prepolymer 4 (including epoxy resin) is solid, meltable, and has a rubbery and tacky consistency at room temperature. The test results are shown in the following table:

Test Results for Prepolymer 4 (Including Epoxy Resin):

| | |
|---|---|
| G' (at 1 rad/sec and 23° C.) | 9,000 Pa |
| G" (at 1 rad/sec and 23° C.) | 20,000 Pa |
| G' (at 10 rad/sec and 23° C.) | 70,000 Pa |
| G" (at 10 rad/sec and 23° C.) | 90,000 Pa |
| Tack at 23° C. | 0.7N |
| Complex viscosity η* at 10 rad/sec and 23° C. | 11,000 Pa · s |
| Complex viscosity η* at 10 rad/sec and 90° C. | 200 Pa · s |

Use 1:

Prepolymer 4 (including epoxy resin) was used for producing a thermally vulcanizable pressure-sensitive adhesive or a thermally vulcanizable pressure-sensitive adhesive layer and for this purpose further mixed according to the following formulation in a twin screw extruder (TSE). The epoxy resin mixed in during prepolymer production is listed separately in the following table.

Composition of the Thermally Vulcanizable Pressure-Sensitive Adhesive Composed of Prepolymer 4:

| Raw material | Percent by weight |
|---|---|
| Prepolymer 4 (excluding epoxy resin) | 51.9 |
| Epikote 828 ® (from prepolymer production) | 13.0 |
| Ground sulfur 80/90° | 6.9 |
| MBTS | 2.1 |
| ZBEC | 0.9 |
| TBzTD | 0.9 |
| Luvomaxx N220 ® | 8.8 |
| talc Pharma M ® | 15.5 |

The following tensile shear strengths were achieved.

Test Results for the Thermally Vulcanizable Pressure-Sensitive Adhesive Composed of Prepolymer 4:

| Test piece | Oil application | Curing | Tensile shear strength [MPa] | Fracture pattern |
|---|---|---|---|---|
| Steel/steel | no | 30 min/180° C. | 10.3 | cohesive |
| Steel/steel | yes | 30 min/180° C. | 9.8 | cohesive |
| Steel/steel | yes | 10 min/230° C. | 9.4 | cohesive |
| Electrolytically galvanized steel/electrolytically galvanized steel | yes | 30 min/180° C. | 9.1 | cohesive |
| Hot-galvanized steel/hot-galvanized steel | yes | 30 min/180° C. | 8.4 | cohesive |
| KTL steel/KTL steel | no | 30 min/140° C. | 8.7 | cohesive |

Use 2:

Prepolymer 4 (including epoxy resin) was used for producing a thermally vulcanizable pressure-sensitive adhesive or a thermally vulcanizable pressure-sensitive adhesive layer and for this purpose further mixed according to the following formulation in a twin screw extruder (TSE). The melting temperature was kept at approx. 100° C.

The epoxy resin mixed in during prepolymer production is listed separately in the following table.

Composition of the Thermally Vulcanizable Adhesive Tape Layer:

| Raw material | Percent by weight |
|---|---|
| Prepolymer 4 (excluding epoxy resin) | 44.8 |
| Epikote 828 ® (from PBD-PU 3 production) | 11.3 |
| Ground sulfur 80/90° | 3.5 |
| ZBEC | 3.0 |
| TBzTD | 3.0 |
| Luvomaxx N220 ® | 0.9 |
| Omyacarb 5-GU ® | 26.1 |
| Rapidquell ® Quicklime CL 90-Q | 3.5 |
| talc Pharma M ® | 3.9 |

Because of the extremely high content of ultra-accelerators, it was possible to set the curing temperature of the adhesive at 120° C., a level below the known range for conventional vulcanization adhesives of 130-250° C.

With the high content of ultra-accelerators and the correspondingly low curing temperature, initial signs of crosslinking were observed in the TSE (specks, gel formation).

Use 3:

In order to further reduce the compounding temperature, prepolymer 4 (including epoxy resin) was used for producing a thermally vulcanizable pressure-sensitive adhesive or a thermally vulcanizable pressure-sensitive adhesive layer, and for this purpose, it was further mixed according to the above formulation for use 2 in a planetary roller extruder (PRE).

The objective was to lower the process temperature in order to reduce the risk of premature crosslinking, particularly with increased proportions of ultra-accelerators.

In the PRE, powdered solid substances such as talc, chalk, lime (calcium oxide), sulfur and an ultra-accelerator premix were incorporated into the PU base according to the formulation. The liquid carbon black dispersion was introduced into a downstream TWE, in which degassing was also carried out.

The prepolymer was fed via a drum extruder with forced feeding into the extruder (model Entex PRE, four-shot, diameter 70 mm, equipped with standard spindles: 7, 7, 7, 6 per shot) (temp. approx. 70° C.). The throughput was approx. 25 kg/h, rotation speed was 70 l/min. It was found that the reduced number of spindles for the last shot is advantageous for a low process temperature.

In order to reduce the complexity of dosing, premixes were prepared for talc and lime and for the ultra-accelerators ZBEC and TBzTD. Only chalk and sulfur were dosed separately. The structure is shown in FIG. 1.

The four roller cylinders were heat-treated at descending temperatures of 70/50/35/35° C., and the central spindle was heated to 20° C. The melt temperature immediately downstream of the PRE was measured at 72° C.

Figure 2:
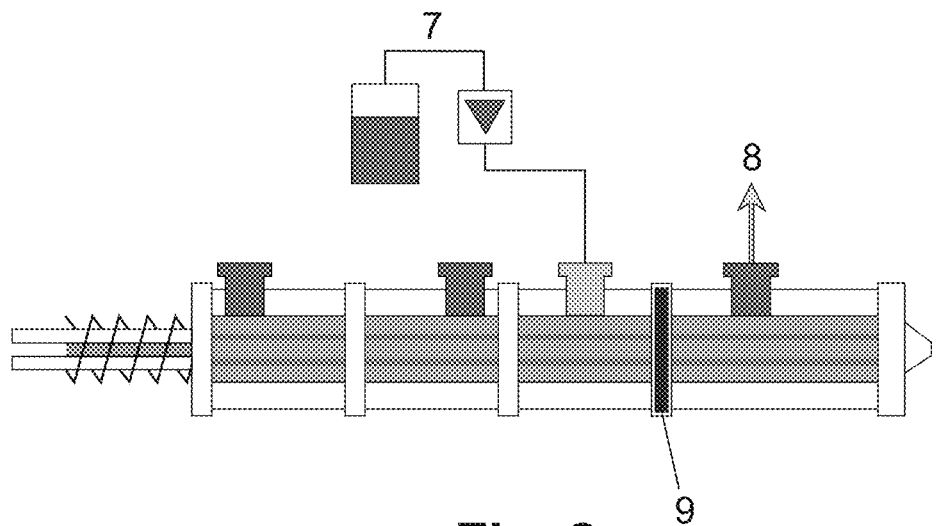
FIG. 2 depicts a schematic of a twin screw extruder, useful with the process of the invention in producing compositions according to the invention.

The compound was transferred to the TSE via a melt pump heated to 75° C. and a subsequent melt tube. The individual zones were preselected to 60° C. at a revolution speed of 110 l/min. The depressor in the degassing area ran at 250 l/min. The outlet temperature was approximately 77° C. FIG. 2 is a schematic view of this part of the system.

As it was possible to keep the temperatures in the PRE and the downstream TSE below 80° C., no fleck/gel formation occurred.

Uses 2 and 3 of prepolymer 4 show that the planetary roller extruder is the preferred device for compounding a thermally curable adhesive having a curing temperature below 130° C., as the curing reaction is not triggered at the low temperatures of this assembly in production of adhesives and adhesive tape, even with an extremely high content of curing agents and a correspondingly low curing temperature.

Example 5

The chemical reaction for forming the polybutadiene polyurethane hotmelt prepolymer according to the invention was carried out in the presence of a plasticizer. The polybutadiene polyurethane hotmelt prepolymer according to the invention (prepolymer 5) has the following composition including the plasticizer Composition of Prepolymer 5 Including Plasticizer

| Raw material | Percent by weight [wt %] | No. of introduced OH or NCO groups relative to percent by weight | Percent ratio of number of OH groups to one another |
|---|---|---|---|
| Krasol LBH 2000 ® | 61.67 | 56.12 mmol OH | 50 |
| 2-ethyl-1,3-hexane diol ® | 4.10 | 56.12 mmol OH | 50 |
| Coscat 83 ® | 0.15 | | |
| Desmodur W ® | 14.08 | 106.62 mmol NCO | |
| Palatinol N ® | 20.00 | | |
| Total | 100.00 | | |

Production was carried out in a 200 l mixing vessel. The percent by weight of Desmodur W® is calculated such that the NCO/OH ratio of the prepolymer is 0.95. The theoretical gel point is calculated at 1.0. Prepolymer 5 (including plasticizer) is solid, meltable, and has a rubbery and tacky consistency at room temperature. The test results are shown in the following table:

Test Results for Prepolymer 5 (Including Plasticizer):

| | |
|---|---|
| G' (at 1 rad/sec and 23° C.) | 1,000 Pa |
| G" (at 1 rad/sec and 23° C.) | 4.300 Pa |
| G' (at 10 rad/sec and 23° C.) | 15,000 Pa |
| G" (at 10 rad/sec and 23° C.) | 30,000 Pa |
| Tack at 23° C. | 0.5N |
| Complex viscosity η* at 10 rad/sec and 23° C. | 3.300 Pa · s |
| Complex viscosity η* at 10 rad/sec and 90° C. | 100 Pa · s |

Use:

Prepolymer 5 (including plasticizer) was used for producing a thermally vulcanizable pressure-sensitive adhesive or a thermally vulcanizable pressure-sensitive adhesive layer and for this purpose further mixed according to the following formulation in a twin screw extruder. The plasticizer mixed in during prepolymer production is listed separately in the following table.

Composition of the Thermally Vulcanizable Pressure-Sensitive Adhesive Composed of Prepolymer 5:

| Raw material | Percent by weight |
|---|---|
| Prepolymer 5 (excluding plasticizer) | 51.9 |
| Palatinol N ® (from prepolymer production) | 13.0 |
| Ground sulfur 80/90° | 6.9 |
| MBTS | 2.1 |
| ZBEC | 0.9 |
| TBzTD | 0.9 |
| Luvomaxx N220 ® | 8.8 |
| talc Pharma M ® | 15.5 |

The following tensile shear strengths were achieved.

Test Results for the Thermally Vulcanizable Pressure-Sensitive Adhesive Composed of Prepolymer 5:

| Test piece | Oil application | Curing | Tensile shear strength [MPa] | Fracture pattern |
|---|---|---|---|---|
| Steel/steel | no | 30 min/180° C. | 11.7 | cohesive |
| Steel/steel | yes | 30 min/180° C. | 9.2 | partially cohesive/partially adhesive |
| Steel/steel | yes | 10 min/230° C. | 7.3 | partially cohesive/partially adhesive |
| Electrolytically galvanized steel/electrolytically galvanized steel | yes | 30 min/180° C. | 6.2 | partially cohesive/partially adhesive |
| Hot-galvanized steel/hot-galvanized steel | yes | 30 min/180° C. | 5.8 | partially cohesive/partially adhesive |
| KTL steel/KTL steel | no | 30 min/140° C. | 9.9 | cohesive |

Example 6

The chemical reaction for forming the polybutadiene polyurethane hotmelt prepolymer according to the invention was carried out in the presence of a plasticizer. The polybutadiene polyurethane hotmelt prepolymer according to the invention (prepolymer 6) has the following composition including the plasticizer:

Composition of Prepolymer 6 Including Plasticizer:

| Raw material | Percent by weight [wt %] | No. of introduced OH or NCO groups relative to percent by weight | Percent ratio of number of OH groups to one another |
|---|---|---|---|
| Krasol LBH 2000 ® | 61.67 | 56.12 mmol OH | 50 |
| 2-ethyl-1,3-hexane diol ® | 4.10 | 56.12 mmol OH | 50 |
| Coscat 83 ® | 0.15 | | |
| Desmodur W ® | 14.08 | 106.62 mmol NCO | |

-continued

| Raw material | Percent by weight [wt %] | No. of introduced OH or NCO groups relative to percent by weight | Percent ratio of number of OH groups to one another |
|---|---|---|---|
| Benzoflex 9-88 SG Plasticizer ® | 20.00 | | |
| Total | 100.00 | | |

Laboratory batches were produced (1 l). The percent by weight of Desmodur W® is calculated such that the NCO/OH ratio of the prepolymer is 0.95. The theoretical gel point is calculated at 1.0.

Prepolymer 6 (including plasticizer) is solid, meltable, and has a rubbery and tacky consistency at room temperature. The test results are shown in the following table:

Test Results for Prepolymer 6 (Including Plasticizer):

| | |
|---|---|
| G' (at 1 rad/sec and 23° C.) | 2,000 Pa |
| G'' (at 1 rad/sec and 23° C.) | 5,700 Pa |
| G' (at 10 rad/sec and 23° C.) | 20,000 Pa |
| G'' (at 10 rad/sec and 23° C.) | 40,000 Pa |
| Tack at 23° C. | 0.6N |
| Complex viscosity η* at 10 rad/sec and 23° C. | 4.400 Pa · s |
| Complex viscosity η* at 10 rad/sec and 90° C. | 150 Pa · s |

Use:

Prepolymer 6 (including plasticizer) was used for producing a thermally vulcanizable pressure-sensitive adhesive or a thermally vulcanizable pressure-sensitive adhesive layer and for this purpose further mixed in the following formulation in a laboratory batch. The plasticizer mixed in during prepolymer production is listed separately in the following table.

Composition of the Thermally Vulcanizable Pressure-Sensitive Adhesive Composed of Prepolymer 6:

| Raw material | Percent by weight |
|---|---|
| Prepolymer 6 (excluding plasticizer) | 51.9 |
| Benzoflex 9-88 SG Plasticizer ® (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer 6:

| Test piece | Oil application | Curing | Tensile shear strength [MPa] | Fracture pattern |
|---|---|---|---|---|
| Steel/steel | no | 30 min/180° C. | 9.8 | cohesive |
| Steel/steel | yes | 30 min/180° C. | 8.0 | partially cohesive/partially adhesive |
| Steel/steel | yes | 10 min/230° C. | 8.1 | partially cohesive/partially adhesive |
| Electrolytically galvanized steel/electrolytically galvanized steel | yes | 30 min/180° C. | 6.4 | partially cohesive/partially adhesive |
| Hot-galvanized steel/hot-galvanized steel | yes | 30 min/180° C. | 6.1 | partially cohesive/partially adhesive |
| KTL steel/KTL steel | no | 30 min/140° C. | 8.4 | cohesive |

Example 7

The chemical reaction for forming the polybutadiene polyurethane hotmelt prepolymer according to the invention was carried out in the presence of a plasticizer. The polybutadiene polyurethane hotmelt prepolymer according to the invention (prepolymer 7) has the following composition including the plasticizer:

Composition of Prepolymer 7 Including Plasticizer:

| Raw material | Percent by weight [wt %] | No. of introduced OH or NCO groups relative to percent by weight | Percent ratio of number of OH groups to one another |
|---|---|---|---|
| Krasol LBH 2000 ® | 61.67 | 56.12 mmol OH | 50 |

-continued

| Raw material | Percent by weight [wt %] | No. of introduced OH or NCO groups relative to percent by weight | Percent ratio of number of OH groups to one another |
|---|---|---|---|
| 2-ethyl-1,3-hexane diol ® | 4.10 | 56.12 mmol OH | 50 |
| Coscat 83 ® | 0.15 | | |
| Desmodur W ® | 14.08 | 106.62 mmol NCO | |
| Hexamoll ® DINCH ® | 20.00 | | |
| Total | 100.00 | | |

Laboratory batches were produced (1 l). The percent by weight of Desmodur W® is calculated such that the NCO/OH ratio of the prepolymer is 0.95.

The theoretical gel point is calculated at 1.0.

Prepolymer 7 (including plasticizer) is solid, meltable, and has a rubbery and tacky consistency at room temperature. The test results are shown in the following table:

Test Results for Prepolymer 7 (Including Plasticizer):

| | |
|---|---|
| G' (at 1 rad/sec and 23° C.) | 1,500 Pa |
| G" (at 1 rad/sec and 23° C.) | 5,200 Pa |
| G' (at 10 rad/sec and 23° C.) | 18,000 Pa |
| G" (at 10 rad/sec and 23° C.) | 35,000 Pa |
| Tack at 23° C. | 0.7N |
| Complex viscosity η* at 10 rad/sec and 23° C. | 3,900 Pa · s |
| Complex viscosity η* at 10 rad/sec and 90° C. | 120 Pa · s |

Composition of the Thermally Vulcanizable Pressure-Sensitive Adhesive Composed of Prepolymer 7:

| Raw material | Percent by weight |
|---|---|
| Prepolymer 7 (excluding plasticizer) | 51.9 |
| Hexamoll ® DINCH ® (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer 7:

| Test piece | Oil application | Curing | Tensile shear strength [MPa] | Fracture pattern |
|---|---|---|---|---|
| Steel/steel | no | 30 min/180° C. | 10.4 | cohesive |
| Steel/steel | yes | 30 min/180° C. | 7.1 | partially cohesive/partially adhesive |
| Steel/steel | yes | 10 min/230° C. | 6.4 | partially cohesive/partially adhesive |
| Electrolytically galvanized steel/electrolytically galvanized steel | yes | 30 min/180° C. | 5.2 | partially cohesive/partially adhesive |
| Hot-galvanized steel/hot-galvanized steel | yes | 30 min/180° C. | 5.0 | partially cohesive/partially adhesive |
| KTL steel/KTL steel | no | 30 min/140° C. | 9.6 | cohesive |

Use:

Prepolymer 7 (including plasticizer) was used for producing a thermally vulcanizable pressure-sensitive adhesive or a thermally vulcanizable pressure-sensitive adhesive layer and for this purpose further mixed in the following formulation in a laboratory batch. The plasticizer mixed in during prepolymer production is listed separately in the following table.

Example 8

The chemical reaction for forming the polybutadiene polyurethane hotmelt prepolymer according to the invention was carried out in the presence of a plasticizer. The polybutadiene polyurethane hotmelt prepolymer according to the invention (prepolymer 8) has the following composition including the plasticizer:

Composition of Prepolymer 8 Including Plasticizer:

| Raw material | Percent by weight [wt %] | No. of introduced OH or NCO groups relative to percent by weight | Percent ratio of number of OH groups to one another |
|---|---|---|---|
| Krasol LBH 2000 ® | 61.67 | 56.12 mmol OH | 50 |
| 2-ethyl-1,3-hexane diol ® | 4.10 | 56.12 mmol OH | 50 |

-continued

| Raw material | Percent by weight [wt %] | No. of introduced OH or NCO groups relative to percent by weight | Percent ratio of number of OH groups to one another |
|---|---|---|---|
| Coscat 83 ® | 0.15 | | |
| Desmodur W ® | 14.08 | 106.62 mmol NCO | |
| Citric acid triethyl ester | 20.00 | | |
| Total | 100.00 | | |

Laboratory batches were produced (1 l). The percent by weight of Desmodur W® is calculated such that the NCO/OH ratio of the prepolymer is 0.95.

The theoretical gel point is calculated at 1.0.

Prepolymer 8 (including plasticizer) is solid, meltable, and has a rubbery and tacky consistency at room temperature. The test results are shown in the following table:

Test Results for Prepolymer 8 (Including Plasticizer):

| | |
|---|---|
| G' (at 1 rad/sec and 23° C.) | 3,000 Pa |
| G" (at 1 rad/sec and 23° C.) | 7.500 Pa |
| G' (at 10 rad/sec and 23° C.) | 25,000 Pa |
| G" (at 10 rad/sec and 23° C.) | 45,000 Pa |
| Tack at 23° C. | 0.8N |
| Complex viscosity $\eta^*$ at 10 rad/sec and 23° C. | 5.100 Pa · s |
| Complex viscosity $\eta^*$ at 10 rad/sec and 90° C. | 150 Pa · s |

Composition of the Thermally Vulcanizable Pressure-Sensitive Adhesive Composed of Prepolymer 8:

| Raw material | Percent by weight |
|---|---|
| Prepolymer 8 (excluding plasticizer) | 51.9 |
| Citric acid triethyl ester (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer 8:

| Test piece | Oil application | Curing | Tensile shear strength [MPa] | Fracture pattern |
|---|---|---|---|---|
| Steel/steel | no | 30 min/180° C. | 9.0 | cohesive |
| Steel/steel | yes | 30 min/180° C. | 5.1 | partially cohesive/partially adhesive |
| Steel/steel | yes | 10 min/230° C. | 5.2 | partially cohesive/partially adhesive |
| Electrolytically galvanized steel/electrolytically galvanized steel | yes | 30 min/180° C. | 4.6 | partially cohesive/partially adhesive |
| Hot-galvanized steel/hot-galvanized steel | yes | 30 min/180° C. | 4.1 | partially cohesive/partially adhesive |
| KTL steel/KTL steel | no | 30 min/140° C. | 8.3 | cohesive |

Use:

Prepolymer 8 (including plasticizer) was used for producing a thermally vulcanizable pressure-sensitive adhesive or a thermally vulcanizable pressure-sensitive adhesive layer and for this purpose further mixed in the following formulation in a laboratory batch. The plasticizer mixed in during prepolymer production is listed separately in the following table.

Example 9

The chemical reaction for forming the polybutadiene polyurethane hotmelt prepolymer according to the invention was carried out in the presence of a plasticizer. The polybutadiene polyurethane hotmelt prepolymer according to the invention (prepolymer 9) has the following composition including the plasticizer Composition of Prepolymer 9 Including Plasticizer

| Raw material | Percent by weight [wt %] | No. of introduced OH or NCO groups relative to percent by weight | Percent ratio of number of OH groups to one another |
|---|---|---|---|
| Krasol LBH 2000 ® | 61.67 | 56.12 mmol OH | 50 |

-continued

| Raw material | Percent by weight [wt %] | No. of introduced OH or NCO groups relative to percent by weight | Percent ratio of number of OH groups to one another |
|---|---|---|---|
| 2-ethyl-1,3-hexane diol ® | 4.10 | 56.12 mmol OH | 50 |
| Coscat 83 ® | 0.15 | | |
| Desmodur W ® | 14.08 | 106.62 mmol NCO | |
| Gravex 925 ® | 20.00 | | |
| Total | 100.00 | | |

Laboratory batches were produced (1 l). The percent by weight of Desmodur W® is calculated such that the NCO/OH ratio of the prepolymer is 0.95.

The theoretical gel point is calculated at 1.0.

Prepolymer 9 (including plasticizer) is solid, meltable, and has a rubbery and tacky consistency at room temperature. The test results are shown in the following table:

Test Results for Prepolymer 9 (Including Plasticizer):

| | |
|---|---|
| G' (at 1 rad/sec and 23° C.) | 5,000 Pa |
| G" (at 1 rad/sec and 23° C.) | 11,000 Pa |
| G' (at 10 rad/sec and 23° C.) | 35,000 Pa |
| G" (at 10 rad/sec and 23° C.) | 60,000 Pa |
| Tack at 23° C. | 0.9N |
| Complex viscosity η* at 10 rad/sec and 23° C. | 6.900 Pa · s |
| Complex viscosity η* at 10 rad/sec and 90° C. | 180 Pa · s |

Composition of the thermally vulcanizable pressure-sensitive adhesive composed of prepolymer 9:

| Raw material | Percent by weight |
|---|---|
| Prepolymer 9 (excluding plasticizer) | 51.9 |
| Gravex 925 ® (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer 9:

| Test piece | Oil application | Curing | Tensile shear strength [MPa] | Fracture pattern |
|---|---|---|---|---|
| Steel/steel | no | 30 min/180° C. | 8.2 | cohesive |
| Steel/steel | yes | 30 min/180° C. | 7.9 | cohesive |
| Steel/steel | yes | 10 min/230° C. | 7.1 | cohesive |
| Electrolytically galvanized steel/electrolytically galvanized steel | yes | 30 min/180° C. | 6.0 | partially cohesive/partially adhesive |
| Hot-galvanized steel/hot-galvanized steel | yes | 30 min/180° C. | 5.4 | partially cohesive/partially adhesive |
| KTL steel/KTL steel | no | 30 min/140° C. | 8.0 | cohesive |

Use:

Prepolymer 9 (including plasticizer) was used for producing a thermally vulcanizable pressure-sensitive adhesive or a thermally vulcanizable pressure-sensitive adhesive layer and for this purpose further mixed in the following formulation in a laboratory batch. The plasticizer mixed in during prepolymer production is listed separately in the following table.

Example 10

The chemical reaction for forming the polybutadiene polyurethane hotmelt prepolymer according to the invention was carried out in the presence of a plasticizer and bitumen. The polybutadiene polyurethane hotmelt prepolymer according to the invention (prepolymer 10) has the following composition, including the plasticizer and the bitumen:

Composition of Prepolymer 10 Including Plasticizer and Bitumen:

| Raw material | Percent by weight [wt %] | No. of introduced OH or NCO groups relative to percent by weight | Percent ratio of number of OH groups to one another |
|---|---|---|---|
| Krasol LBH 2000 ® | 57.80 | 52.6 mmol OH | 50 |
| 2-ethyl-1,3-hexane diol ® | 3.85 | 52.6 mmol OH | 50 |
| Coscat 83 ® | 0.15 | | |

-continued

| Raw material | Percent by weight [wt %] | No. of introduced OH or NCO groups relative to percent by weight | Percent ratio of number of OH groups to one another |
|---|---|---|---|
| Desmodur W ® | 13.20 | 99.94 mmol NCO | |
| Gravex 925 ® | 15.00 | | |
| Azalt 50/70 DE ® | 10.00 | | |
| Total | 100.00 | | |

Laboratory batches were produced (1 l). The percent by weight of Desmodur W® is calculated such that the NCO/OH ratio of the prepolymer is 0.95.

The theoretical gel point is calculated at 1.0.

Prepolymer 10 (including plasticizer and bitumen) is solid, meltable, and has a rubbery and tacky consistency at room temperature. The test results are shown in the following table:

Test Results for Prepolymer 10 (Including Plasticizer and Bitumen):

| | |
|---|---|
| G' (at 1 rad/sec and 23° C.) | 13,000 Pa |
| G" (at 1 rad/sec and 23° C.) | 30,000 Pa |
| G' (at 10 rad/sec and 23° C.) | 100,000 Pa |
| G" (at 10 rad/sec and 23° C.) | 140,000 Pa |
| Tack at 23° C. | 1.3N |
| Complex viscosity η* at 10 rad/sec and 23° C. | 17,000 Pa · s |
| Complex viscosity η* at 10 rad/sec and 90° C. | 380 Pa · s |

Use:

Prepolymer 10 (including plasticizer) was used for producing a thermally vulcanizable pressure-sensitive adhesive or a thermally vulcanizable pressure-sensitive adhesive layer and for this purpose further mixed in the following formulation in a laboratory batch. The plasticizer and the bitumen mixed in during prepolymer production are listed separately in the following table.

Composition of the Thermally Vulcanizable Pressure-Sensitive Adhesive Composed of Prepolymer 10:

| Raw material | Percent by weight |
|---|---|
| Prepolymer 10 (excluding plasticizer and bitumen) | 49.81 |
| Gravex 925 ® (from prepolymer production) | 9.95 |
| Azalt 50/70 DE ® (from prepolymer production) | 6.64 |
| Ground sulfur 80/90° | 6.60 |
| MBTS | 2.00 |
| ZBEC | 0.90 |
| TBzTD | 0.90 |
| Printex 60 ® | 8.40 |
| talc Pharma M ® | 14.80 |

The following tensile shear strengths were achieved.

Test Results for the Thermally Vulcanizable Pressure-Sensitive Adhesive Composed of Prepolymer 10:

| Test piece | Oil application | Curing | Tensile shear strength [MPa] | Fracture pattern |
|---|---|---|---|---|
| Steel/steel | no | 30 min/180° C. | 9.2 | cohesive |
| Steel/steel | yes | 30 min/180° C. | 8.5 | cohesive |
| Steel/steel | yes | 10 min/230° C. | 9.0 | cohesive |
| Electrolytically galvanized steel/electrolytically galvanized steel | yes | 30 min/180° C. | 9.7 | cohesive |
| Hot-galvanized steel/hot-galvanized steel | yes | 30 min/180° C. | 7.3 | partially cohesive/partially adhesive |
| KTL steel/KTL steel | no | 30 min/140° C. | 10.0 | cohesive |

Example 11

The chemical reaction for forming the polybutadiene polyurethane hotmelt prepolymer according to the invention was carried out in the presence of an epoxy resin. The polybutadiene polyurethane hotmelt prepolymer according to the invention (prepolymer 11) has the following composition, including the epoxy resin:

Composition of Prepolymer 11 Including Epoxy Resin:

| Raw material | Percent by weight [wt %] | No. of introduced OH or NCO groups relative to percent by weight | Percent ratio of number of OH groups to one another |
|---|---|---|---|
| Krasol LBH-P 2000 ® | 61.67 | 56.12 mmol OH | 50 |
| 2-ethyl-1,3-hexane diol ® | 4.10 | 56.12 mmol OH | 50 |
| Coscat 83 ® | 0.15 | | |
| Desmodur W ® | 14.08 | 106.62 mmol NCO | |
| Epikote 828 ® | 20.00 | | |
| Total | 100.00 | | |

Laboratory batches were produced (1 l). The percent by weight of Desmodur W® is calculated such that the NCO/OH ratio of the prepolymer is 0.95.

The theoretical gel point is calculated at 1.0.

Prepolymer 11 (including epoxy resin) is solid, meltable, and has a rubbery and tacky consistency at room temperature. The test results are shown in the following table:

Test Results for Prepolymer 11 (Including Epoxy Resin):

| | |
|---|---|
| G' (at 1 rad/sec and 23° C.) | 12,000 Pa |
| G" (at 1 rad/sec and 23° C.) | 25,000 Pa |
| G' (at 10 rad/sec and 23° C.) | 90,000 Pa |

| | |
|---|---|
| G" (at 10 rad/sec and 23° C.) | 120,000 Pa |
| Tack at 23° C. | 0.8N |
| Complex viscosity η* at 10 rad/sec and 23° C. | 15,000 Pa · s |
| Complex viscosity η* at 10 rad/sec and 90° C. | 300 Pa · s |

Use:

Prepolymer 11 (including epoxy resin) was used for producing a thermally vulcanizable pressure-sensitive adhesive or a thermally vulcanizable pressure-sensitive adhesive layer and for this purpose further mixed in the following formulation in a laboratory batch. The epoxy resin mixed in during prepolymer production is listed separately in the following table.

Composition of the Thermally Vulcanizable Pressure-Sensitive Adhesive Composed of Prepolymer 11:

| Raw material | Percent by weight |
|---|---|
| Prepolymer 11 (excluding epoxy resin) | 51.9 |
| Epikote 828 ® (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer 11:

| Test piece | Oil application | Curing | Tensile shear strength [MPa] | Fracture pattern |
|---|---|---|---|---|
| Steel/steel | no | 30 min/180° C. | 9.8 | cohesive |
| Steel/steel | yes | 30 min/180° C. | 9.9 | cohesive |
| Steel/steel | yes | 10 min/230° C. | 9.7 | cohesive |
| Electrolytically galvanized steel/electrolytically galvanized steel | yes | 30 min/180° C. | 9.9 | cohesive |
| Hot-galvanized steel/hot-galvanized steel | yes | 30 min/180° C. | 9.7 | cohesive |
| KTL steel/KTL steel | no | 30 min/140° C. | 10.2 | cohesive |

Example 12

The chemical reaction for forming the polybutadiene polyurethane hotmelt prepolymer according to the invention was carried out in the presence of an epoxy resin. The polybutadiene polyurethane hotmelt prepolymer according to the invention (prepolymer 12) has the following composition, including the epoxy resin:

Composition of Prepolymer 12 Including Epoxy Resin:

| Raw material | Percent by weight [wt %] | No. of introduced OH or NCO groups relative to percent by weight | Percent ratio of number of OH groups to one another |
|---|---|---|---|
| Krasol LBH-P 2000 ® | 61.67 | 56.12 mmol OH | 50 |
| 2-ethyl-1,3-hexane diol ® | 4.10 | 56.12 mmol OH | 50 |
| Coscat 83 ® | 0.15 | | |
| Desmodur W ® | 14.08 | 106.62 mmol NCO | |
| 3,4-Epoxycyclohexyl methyl-3',4'-epoxycyclohexan-carboxylat | 20.00 | | |
| Total | 100.00 | | |

Laboratory batches were produced (1 l). The percent by weight of Desmodur W® was calculated such that the NCO/OH ratio of the prepolymer is 0.95.

The theoretical gel point is calculated at 1.0.

Prepolymer 12 (including epoxy resin) is solid, meltable, and has a rubbery and tacky consistency at room temperature. The test results are shown in the following table:

Test Results for Prepolymer 12 (Including Epoxy Resin):

| | |
|---|---|
| G' (at 1 rad/sec and 23° C.) | 7,000 Pa |
| G" (at 1 rad/sec and 23° C.) | 16,000 Pa |
| G' (at 10 rad/sec and 23° C.) | 50,000 Pa |
| G" (at 10 rad/sec and 23° C.) | 70,000 Pa |
| Tack at 23° C. | 0.7N |
| Complex viscosity η* at 10 rad/sec and 23° C. | 6.600 Pa · s |
| Complex viscosity η* at 10 rad/sec and 90° C. | 180 Pa · s |

Use:

Prepolymer 12 (including epoxy resin) was used for producing a thermally vulcanizable pressure-sensitive adhesive or a thermally vulcanizable pressure-sensitive adhesive layer and for this purpose further mixed in the following formulation in a laboratory batch. The epoxy resin mixed in during prepolymer production is listed separately in the following table.

Composition of the Thermally Vulcanizable Pressure-Sensitive Adhesive Composed of Prepolymer 12:

| Raw material | Percent by weight |
|---|---|
| Prepolymer 12 (excluding epoxy resin) | 51.9 |
| 3,4-epoxycyclohexylmethyl-3',4'-epoxycyclohexane carboxylate (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer 12:

| Test piece | Oil application | Curing | Tensile shear strength [MPa] | Fracture pattern |
|---|---|---|---|---|
| Steel/steel | no | 30 min/180° C. | 9.4 | cohesive |
| Steel/steel | yes | 30 min/180° C. | 9.2 | cohesive |
| Steel/steel | yes | 10 min/230° C. | 8.9 | cohesive |
| Electrolytically galvanized steel/electrolytically galvanized steel | yes | 30 min/180° C. | 8.9 | cohesive |
| Hot-galvanized steel/hot-galvanized steel | yes | 30 min/180° C. | 9.2 | cohesive |
| KTL steel/KTL steel | no | 30 min/140° C. | 9.4 | cohesive |

Example 13

The chemical reaction for forming the polybutadiene polyurethane hotmelt prepolymer according to the invention was carried out in the presence of an epoxy resin. The polybutadiene polyurethane hotmelt prepolymer according to the invention (prepolymer 13) has the following composition, including the epoxy resin:

Composition of Prepolymer 13 Including Epoxy Resin:

| Raw material | Percent by weight [wt %] | No. of introduced OH or NCO groups relative to percent by weight | Percent ratio of number of OH groups to one another |
|---|---|---|---|
| Krasol LBH 3000 ® | 66.13 | 42.33 mmol OH | 50 |
| 2-ethyl-1,3-hexane diol ® | 3.09 | 42.33 mmol OH | 50 |
| Coscat 83 ® | 0.15 | | |
| Desmodur W ® | 10.62 | 80.42 mmol NCO | |
| Epikote 828 ® | 20.00 | | |
| Total | 100.00 | | |

Laboratory batches were produced (1 l). The percent by weight of Desmodur W® is calculated such that the NCO/OH ratio of the prepolymer is 0.95.

The theoretical gel point is calculated at 1.0.

Prepolymer 13 (including epoxy resin) is solid, meltable, and has a rubbery and tacky consistency at room temperature. The test results are shown in the following table:

Test Results for Prepolymer 13 (Including Epoxy Resin):

| | |
|---|---|
| G' (at 1 rad/sec and 23° C.) | 6,000 Pa |
| G" (at 1 rad/sec and 23° C.) | 15,000 Pa |
| G' (at 10 rad/sec and 23° C.) | 50,000 Pa |
| G" (at 10 rad/sec and 23° C.) | 80,000 Pa |
| Tack at 23° C. | 1.0N |
| Complex viscosity η* at 10 rad/sec and 23° C. | 9.400 Pa · s |
| Complex viscosity η* at 10 rad/sec and 90° C. | 270 Pa · s |

Use:

Prepolymer 13 (including epoxy resin) was used for producing a thermally vulcanizable pressure-sensitive adhesive or a thermally vulcanizable pressure-sensitive adhesive layer and for this purpose further mixed in the following formulation in a laboratory batch. The epoxy resin mixed in during prepolymer production is listed separately in the following table.

Composition of the Thermally Vulcanizable Pressure-Sensitive Adhesive Composed of Prepolymer 13:

| Raw material | Percent by weight |
|---|---|
| Prepolymer 13 (excluding epoxy resin) | 51.9 |
| Epikote 828 ® (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer 13:

| Test piece | Oil application | Curing | Tensile shear strength [MPa] | Fracture pattern |
|---|---|---|---|---|
| Steel/steel | no | 30 min/180° C. | 10.8 | cohesive |
| Steel/steel | yes | 30 min/180° C. | 9.9 | cohesive |
| Steel/steel | yes | 10 min/230° C. | 10.5 | cohesive |
| Electrolytically galvanized steel/electrolytically galvanized steel | yes | 30 min/180° C. | 10.2 | cohesive |
| Hot-galvanized steel/hot-galvanized steel | yes | 30 min/180° C. | 9.9 | cohesive |
| KTL steel/KTL steel | no | 30 min/140° C. | 9.0 | cohesive |

Example 14

The chemical reaction for forming the polybutadiene polyurethane hotmelt prepolymer according to the invention was carried out in the presence of an epoxy resin. The polybutadiene polyurethane hotmelt prepolymer according to the invention (prepolymer 14) has the following composition, including the epoxy resin:

Composition of Prepolymer 14 Including Epoxy Resin:

| Raw material | Percent by weight [wt %] | No. of introduced OH or NCO groups relative to percent by weight | Percent Percent ratio of number of OH groups to one another |
|---|---|---|---|
| Krasol LBH 2000 ® | 61.36 | 55.84 mmol OH | 50 |
| 2-butyl-2-ethyl-1,3-propanediol | 4.48 | 55.84 mmol OH | 50 |
| Coscat 83 ® | 0.15 | | |
| Desmodur W ® | 14.01 | 106.09 mmol NCO | |
| Epikote 828 ® | 20.00 | | |
| Total | 100.00 | | |

Laboratory batches were produced (1 l). The percent by weight of Desmodur W® is calculated such that the NCO/OH ratio of the prepolymer is 0.95.

The theoretical gel point is calculated at 1.0.

Prepolymer 14 (including epoxy resin) is solid, meltable, and has a rubbery and tacky consistency at room temperature. The test results are shown in the following table:

Test Results for Prepolymer 14 (Including Epoxy Resin):

| | |
|---|---|
| G' (at 1 rad/sec and 23° C.) | 10,000 Pa |
| G" (at 1 rad/sec and 23° C.) | 22,000 Pa |
| G' (at 10 rad/sec and 23° C.) | 80,000 Pa |
| G" (at 10 rad/sec and 23° C.) | 100,000 Pa |
| Tack at 23° C. | 0.6N |
| Complex viscosity η* at 10 rad/sec and 23° C. | 13,000 Pa · s |
| Complex viscosity η* at 10 rad/sec and 90° C. | 280 Pa · s |

Use:

Prepolymer 14 (including epoxy resin) was used for producing a thermally vulcanizable pressure-sensitive adhesive or a thermally vulcanizable pressure-sensitive adhesive layer and for this purpose further mixed in the following formulation in a laboratory batch. The epoxy resin mixed in during prepolymer production is listed separately in the following table.

Composition of the Thermally Vulcanizable Pressure-Sensitive Adhesive Composed of Prepolymer 14:

| Raw material | Percent by weight |
|---|---|
| Prepolymer 14 (excluding epoxy resin) | 51.9 |
| Epikote 828 ® (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test results for the thermally vulcanizable pressure-sensitive adhesive composed of prepolymer 14:

| Test piece | Oil application | Curing | Tensile shear strength [MPa] | Fracture pattern |
|---|---|---|---|---|
| Steel/steel | no | 30 min/180° C. | 9.1 | cohesive |
| Steel/steel | yes | 30 min/180° C. | 8.5 | cohesive |
| Steel/steel | yes | 10 min/230° C. | 7.9 | cohesive |
| Electrolytically galvanized steel/electrolytically galvanized steel | yes | 30 min/180° C. | 8.3 | cohesive |
| Hot-galvanized steel/hot-galvanized steel | yes | 30 min/180° C. | 8.1 | cohesive |
| KTL steel/KTL steel | no | 30 min/140° C. | 8.0 | cohesive |

Example 15

The chemical reaction for forming the polybutadiene polyurethane hotmelt prepolymer according to the invention was carried out in the presence of an epoxy resin. The polybutadiene polyurethane hotmelt prepolymer according to the invention (prepolymer 15) has the following composition, including the epoxy resin:

Composition of Prepolymer 15 Including Epoxy Resin:

| Raw material | Percent by weight [wt %] | No. of introduced OH or NCO groups relative to percent by weight | Percent ratio of number of OH groups to one another |
|---|---|---|---|
| Krasol LBH 2000 ® | 28.89 | 26.29 mmol OH | 20 |
| poly bd R-45 HTLO ® | 31.30 | 26.29 mmol OH | 20 |
| 2-ethyl-1,3-hexane diol ® | 5.77 | 78.88 mmol OH | 60 |
| Coscat 83 ® | 0.15 | | |
| Desmodur W ® | 13.89 | 105.17 mmol NCO | |
| Epikote 828 ® | 20.00 | | |
| Total | 100.00 | | |

Laboratory batches were produced (1 l). The percent by weight of Desmodur W® is calculated such that the NCO/OH ratio of the prepolymer is 0.80.

The theoretical gel point is calculated at 0.83.

Prepolymer 15 (including epoxy resin) is solid, meltable, and has a rubbery and tacky consistency at room temperature. The test results are shown in the following table:

Test Results for Prepolymer 15 (Including Epoxy Resin):

| | |
|---|---|
| G' (at 1 rad/sec and 23° C.) | 1,500 Pa |
| G" (at 1 rad/sec and 23° C.) | 5,000 Pa |
| G' (at 10 rad/sec and 23° C.) | 15,000 Pa |
| G" (at 10 rad/sec and 23° C.) | 60,000 Pa |
| Tack at 23° C. | 1.6 N |
| Complex viscosity η* at 10 rad/sec and 23° C. | 6.200 Pa · s |
| Complex viscosity η* at 10 rad/sec and 90° C. | 160 Pa · s |

Use:

Prepolymer 15 (including epoxy resin) was used for producing a thermally vulcanizable pressure-sensitive adhesive or a thermally vulcanizable pressure-sensitive adhesive layer and for this purpose further mixed in the following formulation in a laboratory batch. The epoxy resin mixed in during prepolymer production is listed separately in the following table.

Composition of the Thermally Vulcanizable Pressure-Sensitive Adhesive Composed of Prepolymer 15:

| Raw material | Percent by weight |
|---|---|
| Prepolymer 15 (excluding epoxy resin) | 51.9 |
| Epikote 828 ® (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer 15:

| Test piece | Oil application | Curing | Tensile shear strength [MPa] | Fracture pattern |
|---|---|---|---|---|
| Steel/steel | no | 30 min/180° C. | 11.0 | cohesive |
| Steel/steel | yes | 30 min/180° C. | 10.2 | cohesive |
| Steel/steel | yes | 10 min/230° C. | 10.4 | cohesive |
| Electrolytically galvanized steel/electrolytically galvanized steel | yes | 30 min/180° C. | 10.8 | cohesive |
| Hot-galvanized steel/hot-galvanized steel | yes | 30 min/180° C. | 10.1 | cohesive |
| KTL steel/KTL steel | no | 30 min/140° C. | 9.3 | cohesive |

Comparative Example 1

The chemical reaction for forming the polybutadiene polyether-polyurethane hotmelt prepolymer was carried out in the presence of an epoxy resin. The polybutadiene polyether polyurethane hotmelt prepolymer (prepolymer V1) has the following composition, including the epoxy resin:

Composition of prepolymer V1 including epoxy resin:

| Raw material | Percent by weight [wt %] | No. of introduced OH or NCO groups relative to percent by weight | Percent ratio of number of OH groups to one another |
|---|---|---|---|
| Krasol LBH 2000 ® | 31.82 | 28.95 mmol OH | 25 |
| Voranol P 2000L ® | 29.27 | 28.95 mmol OH | 25 |
| 2-ethyl-1,3-hexane diol ® | 4.23 | 57.90 mmol OH | 50 |
| Coscat 83 ® | 0.15 | | |
| Desmodur W ® | 14.53 | 110.01 mmol NCO | |
| Epikote 828 ® | 20.00 | | |
| Total | 100.00 | | |

Laboratory batches were produced (1 l). The percent by weight of Desmodur W® is calculated such that the NCO/OH ratio of the prepolymer is 0.95.

The theoretical gel point is calculated at 1.0.

Prepolymer V1 (including epoxy resin) is solid, meltable, and has a rubbery and tacky consistency at room temperature. The test results are shown in the following table:

Test Results for Prepolymer V1 (Including Epoxy Resin):

| | |
|---|---|
| G' (at 1 rad/sec and 23° C.) | 7,000 Pa |
| G'' (at 1 rad/sec and 23° C.) | 18,000 Pa |
| G' (at 10 rad/sec and 23° C.) | 60,000 Pa |
| G'' (at 10 rad/sec and 23° C.) | 80,000 Pa |
| Tack at 23° C. | 0.9 N |
| Complex viscosity $\eta^*$ at 10 rad/sec and 23° C. | 10,000 Pa · s |
| Complex viscosity $\eta^*$ at 10 rad/sec and 90° C. | 190 Pa · s |

Use:

Prepolymer V1 (including epoxy resin) was used for producing a thermally vulcanizable pressure-sensitive adhesive or a thermally vulcanizable pressure-sensitive adhesive layer and for this purpose further mixed in the following formulation in a laboratory batch. The epoxy resin mixed in during prepolymer production is listed separately in the following table.

Composition of the Thermally Vulcanizable Pressure-Sensitive Adhesive Composed of Prepolymer V1:

| Raw material | Percent by weight |
|---|---|
| Prepolymer V1 (excluding epoxy resin) | 51.9 |
| Epikote 828 ® (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer V1:

| Test piece | Oil application | Curing | Tensile shear strength [MPa] | Fracture pattern |
|---|---|---|---|---|
| Steel/steel | no | 30 min/180° C. | 2.7 | adhesive |
| Steel/steel | yes | 30 min/180° C. | 1.7 | adhesive |
| Steel/steel | yes | 10 min/230° C. | 1.1 | adhesive |
| Electrolytically galvanized steel/electrolytically galvanized steel | yes | 30 min/180° C. | 1.2 | adhesive |
| Hot-galvanized steel/hot-galvanized steel | yes | 30 min/180° C. | 0.7 | adhesive |
| KTL steel/KTL steel | no | 30 min/140° C. | 4.3 | cohesive |

Lower tensile shear strength values were achieved than in examples 1-16, and the fracture patterns were predominantly adhesive.

Comparative Example 2

The chemical reaction for forming the polybutadiene polyester-polyurethane hotmelt prepolymer was carried out in the presence of an epoxy resin. The polybutadiene polyester polyurethane hotmelt prepolymer (prepolymer V2) has the following composition, including the epoxy resin:

Composition of Prepolymer V2 Including Epoxy Resin:

| Raw material | Percent by weight [wt %] | No. of introduced OH or NCO groups relative to percent by weight | Percent ratio of number of OH groups to one another |
|---|---|---|---|
| Krasol LBH 2000 ® | 31.24 | 28.42 mmol OH | 25 |
| Desmophen 1652 ® | 30.20 | 28.42 mmol OH | 25 |
| 2-ethyl-1,3-hexane diol ® | 4.15 | 56.84 mmol OH | 50 |
| Coscat 83 ® | 0.15 | | |
| Desmodur W ® | 14.26 | 107.99 mmol NCO | |
| Epikote 828 ® | 20.00 | | |
| Total | 100.00 | | |

Laboratory batches were produced (1 l). The percent by weight of Desmodur W® is calculated such that the NCO/OH ratio of the prepolymer is 0.95.

The theoretical gel point is calculated at 1.0.

Prepolymer V2 (including epoxy resin) is solid, meltable, and has a rubbery and tacky consistency at room temperature. The test results are shown in the following table:

Test Results for Prepolymer V2 (Including Epoxy Resin):

| | |
|---|---|
| G' (at 1 rad/sec and 23° C.) | 12,000 Pa |
| G" (at 1 rad/sec and 23° C.) | 25,000 Pa |
| G' (at 10 rad/sec and 23° C.) | 90,000 Pa |
| G" (at 10 rad/sec and 23° C.) | 100,000 Pa |
| Tack at 23° C. | 0.5 N |
| Complex viscosity η* at 10 rad/sec and 23° C. | 13,000 Pa · s |
| Complex viscosity η* at 10 rad/sec and 90° C. | 290 Pa · s |

Use:

Prepolymer V2 (including epoxy resin) was used for producing a thermally vulcanizable pressure-sensitive adhesive or a thermally vulcanizable pressure-sensitive adhesive layer and for this purpose further mixed in the following formulation in a laboratory batch. The epoxy resin mixed in during prepolymer production is listed separately in the following table.

Composition of the Thermally Vulcanizable Pressure-Sensitive Adhesive Composed of Prepolymer V2:

| Raw material | Percent by weight |
|---|---|
| Prepolymer V2 (excluding epoxy resin) | 51.9 |
| Epikote 828 ® (from prepolymer production) | 13.0 |
| Ground sulfur 80/90° | 6.9 |
| MBTS | 2.1 |
| ZBEC | 0.9 |
| TBzTD | 0.9 |
| Printex 60 ® | 8.8 |
| talc Pharma M ® | 15.5 |

The following tensile shear strengths were achieved.

Test Results for the Thermally Vulcanizable Pressure-Sensitive Adhesive Composed of Prepolymer V2:

| Test piece | Oil application | Curing | Tensile shear strength [MPa] | Fracture pattern |
|---|---|---|---|---|
| Steel/steel | no | 30 min/180° C. | 3.3 | adhesive |
| Steel/steel | yes | 30 min/180° C. | 1.9 | adhesive |
| Steel/steel | yes | 10 min/230° C. | 1.2 | adhesive |
| Electrolytically galvanized steel/electrolytically galvanized steel | yes | 30 min/180° C. | 1.3 | adhesive |
| Hot-galvanized steel/hot-galvanized steel | yes | 30 min/180° C. | 1.0 | adhesive |
| KTL steel/KTL steel | no | 30 min/140° C. | 3.3 | partially cohesive/partially adhesive |

Lower tensile shear strength values were achieved than in examples 1-16, and the fracture patterns were predominantly adhesive.

Comparative Example 3

The polybutadiene polyurethane hotmelt prepolymer (prepolymer V3) has the following composition:

Composition of Prepolymer V3:

| Raw material | Percent by weight [wt %] | No. of introduced OH or NCO groups relative to percent by weight | Percent ratio of number of OH groups to one another |
|---|---|---|---|
| Krasol LBH 2000 ® | 77.83 | 70.83 mmol OH | 50 |
| 2-ethyl-1,3-hexane diol ® | 5.18 | 70.83 mmol OH | 50 |
| Coscat 83 ® | 0.15 | | |
| 4,4'-methylene-bis-(phenyl isocyanate) | 16.84 | 134.57 mmol NCO | |
| Total | 100.00 | | |

Laboratory batches were produced (1 l). The percent by weight of 4,4'-methylene-bis-(phenyl isocyanate) is calculated such that the NCO/OH ratio of the prepolymer is 0.95. The theoretical gel point is calculated at 1.0.

Prepolymer V3 is solid and meltable at room temperature, but not tacky.

LEGEND FOR THE FIGURES

FIG. 1: Planetary roller extruder
1: Input prepolymer
2: Inlet sulfur
3: Inlet chalk
4: Inlet premix talc & lime
5: Inlet premix ultra-accelerator (ZBEC/TBzTD)
6: Outlet compound
FIG. 2: Twin screw extruder
7: Supply carbon black dispersion
8: Degassing (<0.1 bar)
9: Blister

The invention claimed is:

1. A hydroxyl-functionalized polybutadiene polyurethane hotmelt prepolymer, comprising the chemical reaction product of at least one polybutadiene diol having a number-average mean molecular weight between greater than 1,000 g/mol and less than 5,000 g/mol, at least one chain extender having a hydroxyl functionality of two and a molecular weight of less than or equal to 300 g/mol and optionally at least one polybutadiene polyol with a number-average mean functionality between greater than 2.0 and less than or equal to 3.0 only with at least one aliphatic or alicyclic diisocyanate, wherein the chemical reaction for forming the hydroxyl-functionalized polybutadiene polyuethane hotmelt prepolymer is carried out in the presence of an epoxy resin, and wherein the numerical proportion of the hydroxyl groups introduced for forming the hydroxyl-functionalized polybutadiene polyuethane hotmelt prepolymer that originate from the at least one chain extender is between greater than or equal to 20.0% and less than or equal to 80.0%.

2. The hydroxyl-functionalized polybutadiene polyurethane hotmelt prepolymer of claim 1, which includes the at least one polybutadiene polyol which has a number-average mean functionality between greater than 2.0 and less than or equal to 3.0, and has a number-average mean molecular weight between greater than 1,000 g/mol and less than 5,000 g/mol.

3. The hydroxyl-functionalized polybutadiene polyurethane hotmelt prepolymer according to claim 1, wherein the at least one polybutadiene polyol is present, and the numerical proportion of the hydroxyl groups introduced for forming the hydroxyl-functionalized polybutadiene polyurethane hotmelt prepolymer that originate from the at least one polybutadiene polyol with a number-average mean functionality between greater than 2.0 and less than or equal to 3.0 is a maximum of 50.0%.

4. The hydroxyl-functionalized polybutadiene polyurethane hotmelt prepolymer according to claim 1, wherein the at least one aliphatic or alicyclic diisocyanate is or comprises isophorone diisocyanate and/or dicyclohexylmethane-4,4'-diisocyanate.

5. The hydroxyl-functionalized polybutadiene polyurethane hotmelt prepolymer according to claim 1, wherein the ratio of the total number of isocyanate groups to the total number of hydroxyl groups of the reactants of the chemical reaction to form the hydroxyl-functionalized polybutadiene polyurethane hotmelt prepolymer is between greater than 0.65 and less than 1.0.

6. A method of producing the hydroxyl-functionalized polybutadiene polyurethane hotmelt prepolymer according to claim 1, wherein the chemical reaction for forming the hydroxyl-functionalized polybutadiene polyurethane hotmelt prepolymer is carried out with addition of a catalyst.

7. An adhesive comprising as a base elastomer the hydroxyl-functionalized polybutadiene hotmelt prepolymer of claim 1, which is a thermally vulcanizable and pressure-sensitive adhesive.

8. An adhesive tape comprising the least one thermally vulcanizable pressure-sensitive adhesive according to claim 7.

9. A method of producing an adhesive tape according to claim 8, wherein the compounding and coating of the thermally vulcanizable pressure-sensitive adhesive is carried out in a solvent-free manner and continuously.

10. The method of claim 9, wherein the compounding is carried out in a continuously operating mixing assembly.

11. The method of claim 10, wherein the mixing assembly is a planetary roller extruder.

12. The method of claim 6, wherein the catalyst is a bismuth and carbon-containing catalyst.

13. The method of claim 12, wherein the catalyst is a bismuth carboxylate.

14. A thermally-vulcanizable pressure-sensitive adhesive comprising hydroxyl-functionalized polybutadiene polyurethane hotmelt prepolymer produced according the method of claim 6.

15. A thermally-vulcanizable pressure-sensitive adhesive comprising hydroxyl-functionalized polybutadiene polyurethane hotmelt prepolymer produced according the method of claim 9.

16. A method of producing a thermally valcanizable pressure-sensitive adhesive, comprising as a base elastomer a hydroxyl-functionalized polybutadiene polyuethane hot-melt prepolymer which comprises the chemical reaction product of at least one polybutadiene diol, at least one chain extender having a hydroxyl functionality of two and a molecular weight of less than or equal to 300 g/mol, further optionally with at least one polybutadiene polyol with a number-average mean functionality between greater than 2.0 and less than or equal to 3.0 with at least one aliphatic or alicyclic diisocyanate, wherein, compounding of the thermally vulcanizable pressure-sensitive adhesive is carried out in a solvent-free and continuous manner, and during which vulcanization materials, vulcanization accelerators, vulcanization auxiliaries or additives are added.

17. The method of claim 16, wherein the compounding is carried out at least partially in a planetary roller extruder during which compounding is added vulcanization materials, vulcanization accelerators, vulcanization auxiliaries or additives and optionally further fillers, auxiliaries and/or additives during the continuous compounding process.

18. The method of claim 17, wherein the temperature of the compounding does not exceed 90° C.

19. A thermally-vulcanizable pressure-sensitive adhesive comprising hydroxyl-functionalized polybutadiene polyurethane hotmelt prepolymer produced according the method of claim 16.

20. A thermally-vulcanizable pressure-sensitive adhesive comprising hydroxyl-functionalized polybutadiene polyurethane hotmelt prepolymer produced according the method of claim 16, occurs in the presence of an epoxy resin.

* * * * *